United States Patent
Samal et al.

(10) Patent No.: US 12,482,498 B1
(45) Date of Patent: Nov. 25, 2025

(54) SYSTEM AND METHOD FOR AI-POWERED NARRATIVE ANALYSIS OF VIDEO CONTENT

(71) Applicant: CBS Interactive Inc., San Francisco, CA (US)

(72) Inventors: Partha Sarathi Samal, Rocky Hill, CT (US); Alexandr Popov, Oceanside, CA (US); Behrang Zandi, Danville, CA (US); Suresh Kumar Palus, Secane, PA (US); Sai Kiran Padmam, Jersey City, NJ (US); Kamal Viola, Queens, NY (US); Jonathan Ortiz, San Francisco, CA (US)

(73) Assignee: PARAMOUNT GLOBAL, New York, NY (US)

( * ) Notice: Subject to any disclaimer, the term of this patent is extended or adjusted under 35 U.S.C. 154(b) by 0 days.

(21) Appl. No.: 18/812,664

(22) Filed: Aug. 22, 2024

(51) Int. Cl.
*G11B 27/031* (2006.01)
*G06F 40/35* (2020.01)
(Continued)

(52) U.S. Cl.
CPC ........... *G11B 27/031* (2013.01); *G06F 40/35* (2020.01); *G06V 10/776* (2022.01); *G06V 10/82* (2022.01);
(Continued)

(58) Field of Classification Search
CPC ....... G11B 27/031; G11B 27/34; G06F 40/35; G06V 40/174; G06V 10/82; G06V 20/41; G06V 10/776
See application file for complete search history.

(56) References Cited

U.S. PATENT DOCUMENTS

| | | | |
|---|---|---|---|
| 10,999,566 B1 * | 5/2021 | Mahyar | G06F 40/166 |
| 2021/0187389 A1 * | 6/2021 | Hansen | A63F 13/42 |
| 2023/0274481 A1 * | 8/2023 | Gustman | G06V 10/945 |
| | | | 715/202 |

\* cited by examiner

*Primary Examiner* — Mishawn N. Hunter
(74) *Attorney, Agent, or Firm* — Fay Kaplun & Marcin, LLP

(57) ABSTRACT

A system, a method and a processor are for AI-powered generation and delivery of video clips. The processor is configured to: load a first video file of a first video content item, the first video file comprising video frames associated with timestamps; load a first subtitle file of the first video content item, the first subtitle file comprising subtitle text associated with the timestamps; execute a natural language processing (NLP) model with the subtitle text as input, the NLP model including language pre-processing steps for classifying words, names or phrases in the subtitle text and associating initial classifiers with the subtitle text, the NLP model including one or more of a recurrent neural network (RNN), a Bidirectional Encoder Representations from Transformers (BERT) model, or a generative pre-trained transformer (GPT) model for a dialogue analysis comprising processing sequences of dialogue in the subtitle text in view of the initial classifiers to associate one or more portions of the dialogue with one or more first classifiers of first narrative elements; execute an image recognition model with at least some of the video frames as input, the image recognition model including a convolutional neural network (CNN) for an object detection analysis and a facial recognition analysis comprising processing video sequences to associate one or more of the video frames with one or more second classifiers of second narrative elements; generate a narrative map of the first video content item by temporally aligning the first narrative elements with the second narrative elements based on the timestamps associated with the video frames and the first subtitle file; and generate a video (Continued)

clip including at least one segment of the first video content item, the at least one segment including selected video frames associated with at least one of the first or second narrative elements identified from the narrative map and selected for inclusion in the video clip.

20 Claims, 15 Drawing Sheets

(51) Int. Cl.
*G06V 10/776* (2022.01)
*G06V 10/82* (2022.01)
*G06V 20/40* (2022.01)
*G06V 40/16* (2022.01)
*G11B 27/34* (2006.01)

(52) U.S. Cl.
CPC ............ *G06V 20/41* (2022.01); *G06V 40/174* (2022.01); *G11B 27/34* (2013.01)

SYSTEM AND METHOD FOR AI-POWERED NARRATIVE ANALYSIS OF VIDEO CONTENT

BACKGROUND

A video streaming service may allow a user to access video content on demand. The streaming service can include a library of video content that is made available to the user. The user can select a particular video content item and stream the content in accordance with user-selected streaming options such as, e.g., language, subtitles, etc., and ongoing user inputs such as, e.g., pause, resume, rewind, etc. Some video streaming services include a recommendation functionality in which user data such as, e.g., video content streaming history, genre preferences, etc., is considered and video content is recommended to the user that is consistent with the user data Many consumers of streaming media watch video content in short bursts when their busy lives allow for it. Some users can pause and restart a video content item (e.g., a movie or an episode of a show) multiple times before completing the video content. In some cases, a user may pause the video content item in the middle of a scene and a long duration can elapse before resuming, such that the user has lost the narrative thread upon resuming. Other users may prefer to watch only certain parts of a particular content item, or rewatch a specific part after an initial viewing. Still other users may seek recommendations for new video content and wish to stream only part of a recommended content item (e.g., a few scenes that are representative of the video content as a whole) prior to watching the video content in full.

Thus, in many cases, a user may prefer to watch a shortened version of video content that captures one or more particular narrative moments or scenes of the video content. Accordingly, it may be desirable to facilitate the streaming of video content in a condensed and/or segmented form so that a user can experience part of the video content within a shortened time duration while maintaining the narrative coherency of the video content.

SUMMARY

The present disclosure relates to a system, a method and a processor for AI-powered generation and delivery of video clips. The processor is configured to: classify a first video content item including a first video file comprising video frames associated with timestamps and a first subtitle file comprising subtitle text associated with the timestamps. The first video content item is classified with narrative classifiers by executing a natural language processing (NLP) model with the first subtitle file as input, the NLP model including a dialogue analysis for identifying first narrative elements from dialogue included in the first subtitle file and associating the first narrative elements with first timestamps; executing an image recognition model with the first video file as input, the image recognition model including an object identification analysis for identifying second narrative elements from objects or persons portrayed in the video frames of the first video file and associating the second narrative elements with second timestamps; combining a first output of the NLP model with a second output of the image recognition model, and generating a first set of timestamps associated with the narrative classifiers.

In addition, the processor is configured to: define one or more segments within the first video content item, each segment comprising a starting timestamp and an ending timestamp defining a duration and having one or more of the narrative classifiers associated therewith; and generate a video clip including one or more of the segments based on prioritization rules in which some narrative classifiers are associated with a priority for inclusion in the video clip, the one or more segments selected for inclusion in the video clip so that a combined duration of the one or more segments is less than a set time value, the set time value being less than a full duration of the first video content item.

In an embodiment, the narrative classifiers include classifiers related to a broader narrative extending through the first video content item, the prioritization rules assigning a higher priority to some aspects of the first video content item associated with the broader narrative relative to other aspects of the first video content item not associated with the broader narrative.

In an embodiment, the narrative classifiers include classifiers related to narrative features specific to a particular scene or a particular moment within the particular scene, the prioritization rules assigning a higher priority to some aspects of the first video content item associated with the narrative features relative to other aspects of the first video content item not associated with the narrative features.

In an embodiment, the NLP model includes the dialogue analysis, a thematic analysis and event detection, wherein the first narrative elements identified by the NLP model include dialogue, phrases, and character interactions having narrative significance.

In an embodiment, the NLP model comprises an architecture based on at least one of a recurrent neural network (RNN), a long short term memory (LSTM) network, a convolutional neural network (CNN), a bidirectional encoder representations from transformers (BERT) model, or a generative pre-trained transformer (GPT) model.

In an embodiment, the image recognition model includes the object detection, facial detection, scene classification and event detection, wherein the second narrative plot points identified by the image recognition model include character identification, facial identification, emotion identification, events having narrative significance identification and setting.

In an embodiment, the image recognition model comprises an architecture based on at least one of a convolutional neural network (CNN) or a supervised learning model.

In an embodiment, combining the first output of the NLP model with the second output of the image recognition model includes at least one of sentiment analysis, thematic clustering, or reinforcement learning.

In an embodiment, the processor is further configured to: process a user request for the video clip, the user request including an identification of the first video content item and a maximum time duration for the video clip indicating the set time value.

In an embodiment, the user request further includes narrative preferences that are manually entered by a user or are determined based on a user profile. Based on the narrative preferences, some narrative classifiers are prioritized over other narrative classifiers when defining the one or more segments.

In an embodiment, the first output of the NLP model, the second output of the image recognition model, or a third output combining the first output with the second output is stored as a first content analysis in association with the first video content item so that, when a user request for clip generation is received, only defining the one or more segments and generating the video clip are to be performed.

In an embodiment, a respective content analysis is stored for multiple video content items in association with each respective video content item to enable generating video clips for each of the multiple video content items.

In an embodiment, the processor further is configured to: select a given video content item as a recommendation for a user. The user does not select or request the given video content item prior to the processor generating the video clip from the given video content item and delivering the video clip to the user.

In an embodiment, the user is matched to the given video content item based on user inputs or a user profile.

In an embodiment, the processor is further configured to: generate the user profile based on at least one of the user inputs, genre preferences, or historical viewing data.

In an embodiment, the processor further is configured to: execute a recommendation model for matching the user to the given video content item, the recommendation model including collaborative filtering or matrix factorization.

In an embodiment, the recommendation model further includes reinforcement learning by maximizing a cumulative reward signal based on user satisfaction and engagement.

In an embodiment, the video clip is generated in advance of any user request, stored in association with the first video content item, and delivered to a user on demand.

In an embodiment, multiple clips of differing durations are pre-generated for the first video content item and are available for selection by the user.

In an embodiment, the narrative classifiers are specific to a genre of the first video content item, a scene within the first video content item, or a moment within the scene.

In addition, the present disclosure relates to a system, a method and a processor for AI-powered generation and delivery of video clips. The processor is configured to: load a first video content item including a first video file comprising video frames and a first subtitle file comprising subtitle text; execute a machine learning (ML) model comprising natural language processing (NLP) for processing sequences of dialogue in the subtitle text and image recognition for processing video sequences, wherein an output of the ML model comprises an association of one or more narrative classifiers with one or more moments or scenes in the first video content item; generate a video clip including at least one segment of the first video content item, the at least one segment including selected video frames associated with at least one of the narrative classifiers; and deliver the video clip to a user associated with a user profile or one or more user inputs.

Either: the at least one segment is selected for inclusion in the video clip based on the user profile or the one or more user inputs, or delivering the video clip to the user is based on the user profile or the one or more user inputs.

In an embodiment, the user profile or the one or more user inputs indicates one or more scene types preferred by the user. The at least one segment is selected for inclusion in the video clip based on the selected video frames being associated with narrative classifiers related to the one or more scene types preferred by the user.

In an embodiment, the user profile indicates a preferred duration of video content or the one or more user inputs directly indicates a maximum duration of the video content. The at least one segment is selected for inclusion in the video clip so that the video clip has a duration less than the preferred duration or the maximum duration.

In an embodiment, the user profile or the one or more user inputs indicates one or more genres preferred by the user. The video clip is delivered to the user as a recommendation based on at least one of the narrative classifiers being associated with at least one of the genres.

In an embodiment, the user profile or the one or more user inputs indicates one or more actors preferred by the user. The video clip is delivered to the user as a recommendation based on at least one of the narrative classifiers being associated with at least one of the actors.

In an embodiment, the user profile is generated based on an analysis of historical viewing data associated with the user, the analysis identifying patterns or preferences in genres, themes, or types of narrative content.

In an embodiment, the video clip is delivered to the user as a recommendation based on at least one of the narrative classifiers being associated with at least one of the genres, themes, or types of narrative content.

In an embodiment, the at least one segment is selected for inclusion in the video clip based on the selected video frames being associated with narrative classifiers related to the types of narrative content preferred by the user.

In an embodiment, the user profile is generated based on ML techniques including clustering or collaborative filtering in which patterns or preferences of other users are analyzed for applicability to the user. The video clip is delivered to the user as a recommendation based on the clustering or collaborative filtering.

In an embodiment, the user profile is generated based on deep learning techniques configured to analyze user behavior and predict user preferences. The at least one segment is selected for inclusion in the video clip based on predicted user preferences.

In an embodiment, the user profile is generated based on an analysis of user behavior with regard to video streaming habits including pausing, rewinding, or fast-forwarding. The at least one segment is selected for inclusion in the video clip based on the video streaming habits.

In an embodiment, the user profile is generated based on an analysis of user behavior with regard to video streaming habits including watch time, completion of video content, or failure to complete video content. The video clip is delivered to the user as a recommendation based on the video streaming habits.

In an embodiment, the one or more user inputs include user feedback including likes, dislikes, ratings, or comments for one or more particular video content items. The video clip is delivered to the user as a recommendation based on the user feedback.

In an embodiment, the processor is further configured to: execute a sentiment analysis on user comments to understand user emotions or satisfaction levels associated with a particular video content item. The video clip is delivered to the user as a recommendation based on the sentiment analysis.

In an embodiment, the processor is further configured to: generate a narrative map of the first video content item based on the one or more narrative classifiers in advance of generating the video clip; and assign a priority to one or more moments or scenes associated with the one or more narrative classifiers based on the user profile or the one or more user inputs. The at least one segment is selected for inclusion in the video clip based on the priority.

In an embodiment, the video clip is delivered to the user as a recommendation based on content-based filtering in which the one or more narrative classifiers are matched to the user profile.

In an embodiment, the processor is further configured to: identify new user inputs or behaviors; and update the user profile so that the new user inputs or behaviors have a stronger weight relative to prior user inputs or behaviors.

In an embodiment, the processor is further configured to: execute reinforcement learning techniques based on user feedback related to the video clip.

In an embodiment, the processor of claim 1, further configured to: prompt the user to select genres, shows, narrative elements, or actors preferred by the user. The user profile is generated based on the genres, shows, narrative elements, or actors preferred by the user.

In an embodiment, the processor is further configured to: record user interactions including viewing history, types of video content viewed, frequency of views, and user behaviors while viewing a particular video content item; and dynamically update the user profile based on recorded user interactions.

Furthermore, the present disclosure relates to a system, a method and a processor for AI-powered narrative analysis of video content. The processor is configured to: load a first video file of a first video content item, the first video file comprising video frames associated with timestamps; load a first subtitle file of the first video content item, the first subtitle file comprising subtitle text associated with the timestamps; execute a natural language processing (NLP) model with the subtitle text as input, the NLP model including language pre-processing steps for classifying words, names or phrases in the subtitle text and associating initial classifiers with the subtitle text, the NLP model including one or more of a recurrent neural network (RNN), a Bidirectional Encoder Representations from Transformers (BERT) model, or a generative pre-trained transformer (GPT) model for a dialogue analysis comprising processing sequences of dialogue in the subtitle text in view of the initial classifiers to associate one or more portions of the dialogue with one or more first classifiers of first narrative elements; execute an image recognition model with at least some of the video frames as input, the image recognition model including a convolutional neural network (CNN) for an object detection analysis and a facial recognition analysis comprising processing video sequences to associate one or more of the video frames with one or more second classifiers of second narrative elements; generate a narrative map of the first video content item by temporally aligning the first narrative elements with the second narrative elements based on the timestamps associated with the video frames and the first subtitle file; and generate a video clip including at least one segment of the first video content item, the at least one segment including selected video frames associated with at least one of the first or second narrative elements identified from the narrative map and selected for inclusion in the video clip.

In an embodiment, the language pre-processing steps include tokenization, part-of-speech tagging and named entity recognition of the subtitle text to identify the initial classifiers.

In an embodiment, the NLP model includes the RNN or the BERT model for performing the dialogue analysis, the dialogue analysis including one or more of a sentiment analysis, a contextual analysis, an emotion detection analysis and a keyword extraction, the RNN or the BERT model processing sequences of the dialogue to identify the one or more first classifiers of the first narrative elements based on the sentiment analysis, the contextual analysis, the emotion detection analysis or the keyword extraction.

In an embodiment, the NLP model includes a Latent Dirichlet Allocation (LDA) for performing a thematic analysis, the LDA configured for topic modeling to categorize the dialogue into themes based on word co-occurrence patterns, the LDA identifying the one or more first classifiers of the first narrative elements based on the thematic analysis.

In an embodiment, the NLP model includes the GPT model for performing a thematic analysis, the GPT model configured for supplementing the dialogue analysis by generating text based on patterns in the dialogue to predict narrative developments, the GPT identifying the one or more first classifiers of the first narrative elements based on the thematic analysis.

In an embodiment, the image recognition model includes the CNN for performing an event detection analysis, the event detection analysis configured to detect narrative events in the video frames, wherein the NLP model supplements the event detection by providing context for the narrative events detected in the video frames, the CNN identifying the one or more second classifiers of the second narrative elements based on the event detection analysis.

In an embodiment, the processor is further configured to: extract from the first video file a subset of the video frames at a predetermined frequency; and preprocess the subset of the video frames by resizing or normalization so that the input to the image recognition model has a predetermined form.

In an embodiment, the image recognition model includes the CNN for performing an emotion recognition analysis, the emotion recognition analysis including identifying emotions on faces depicted in one video frame or a sequence of video frames, the CNN identifying the one or more second classifiers of the second narrative elements based on the emotion recognition analysis.

In an embodiment, the image recognition model includes the CNN for performing a scene classification analysis, the scene classification analysis including classifying scenes depicted in the sequence of the based on at least one of the object detection analysis, the facial recognition analysis and the emotion recognition analysis, the CNN identifying the one or more second classifiers of the second narrative elements based on the scene classification analysis.

In an embodiment, the image recognition model includes the CNN for performing an action recognition analysis, the action recognition analysis including identifying actions depicted in the sequence of the video frames based on at least one of the object detection analysis, the facial recognition analysis and the emotion recognition analysis, the CNN identifying the one or more second classifiers of the second narrative elements based on the action recognition analysis.

In an embodiment, the processor is further configured to: generate a set of third narrative elements based on temporally aligning the first narrative elements with the second narrative elements and correlating contextual information identified in the first narrative elements and the second narrative elements, each of the third narrative elements associated with a corresponding one or more timestamps.

In an embodiment, the narrative map is generated based on a coherence analysis and a continuity analysis in which it is determined that the third narrative elements maintain a logical narrative flow.

In an embodiment, one or more of the third narrative elements are associated with a priority in which one or more of the third narrative elements are associated with a higher priority for inclusion in the video clip than other ones of the third narrative elements.

In an embodiment, the priority is determined by a support vector machine (SVM) or a decision tree ranking the third narrative elements based on a narrative significance.

In an embodiment, the processor is further configured to: collect first training data including subtitles, transcripts and dialogues for multiple different video content items; preprocess the first training data by text cleaning, tokenization and named entity recognition (NER); label text from the first training data with one or more of the first classifiers based on the preprocessing; and create a first training set comprising labeled text associated with the first classifiers.

In an embodiment, the processor is further configured to: fine-tune the NLP model by annotated subtitle data using transfer learning techniques; and validate the NLP model using a validation dataset.

In an embodiment, the processor is further configured to: collect second training data including video files and images for multiple different video content items; label video frames from the second training data with one or more of the second classifiers; and create a second training set including labeled video frames associated with the second classifiers.

In an embodiment, the processor is further configured to: fine-tune the image recognition model by annotated image data using transfer learning techniques; and validate the image recognition model using a validation dataset.

In an embodiment, the narrative map includes at least one priority associated with at least one of the first and second narrative elements, wherein the video clip is generated based on predefined maximum duration for the video clip and the one or more segments are selected based on the at least one priority.

In an embodiment, the video clip is generated based on the narrative map to ensure coherent sequence and continuity.

In addition, the present disclosure relates to a system, a method and a processor for AI-powered narrative analysis of video content. The processor is configured to: load a first video content item including a first video file comprising video frames and a first subtitle file comprising subtitle text; execute a machine learning (ML) model comprising natural language processing (NLP) for processing sequences of dialogue in the subtitle text and image recognition for processing video sequences, wherein an output of the ML model comprises an association of one or more narrative classifiers with one or more moments or scenes in the first video content item; generate a narrative map of the first video content item in which the one or more moments or scenes associated with the one or more narrative classifiers are assigned a priority based on definitions or rules related to narrative importance; and generate a video clip including at least one segment of the first video content item, the at least one segment including selected video frames associated with at least one of the narrative classifiers having a high priority relative to other video frames.

In an embodiment, the ML model comprises NLP techniques including one or more of a dialogue analysis, a sentiment analysis, a contextual analysis, an emotion detection analysis and a thematic analysis, wherein the ML model comprises image recognition techniques including one or more of an event detection analysis, a facial recognition analysis, an emotion recognition analysis, a scene classification analysis and an action recognition analysis.

In an embodiment, the processor is further configured to: based on the output of the ML model, determine a first prioritization of the narrative classifiers in which a first subset of the narrative classifiers are determined to have a narrative importance greater than a remainder of the narrative classifiers, wherein the at least one segment is selected for inclusion in the video clip based on the first prioritization.

In an embodiment, the first subset of the narrative classifiers includes selected narrative classifiers related to particular plot points, character development, revelations, or particular emotional tones.

In an embodiment, the first subset of narrative classifiers includes selected narrative classifiers related to action sequences.

In an embodiment, the processor is further configured to: determine a second prioritization of the first subset of narrative classifiers in which a second subset of the first subset of narrative classifiers are determined to have an importance greater than a remainder of the subset of narrative classifiers, wherein the at least one segment is selected for inclusion in the video clip based on the second prioritization.

In an embodiment, the second prioritization is based on user input or a user profile indicating preferred types of narrative content for a particular user.

In an embodiment, multiple non-contiguous segments of the first video content item are selected for inclusion in the video clip. The processor is further configured to: prior to generating the video clip, performing a cohesion and continuity analysis in which it is determined that the multiple non-contiguous segments of the first video content item maintain a logical narrative progression.

In an embodiment, the narrative map is generated in advance of generating the video clip, wherein the video clip is generated on-demand in view of constraints that influence a selection of the moments or scenes to include in the video clip.

In an embodiment, the constraints include a maximum duration of the video clip that is less than a total runtime of the video content item.

In an embodiment, different degrees of prioritization are assigned to different narrative classifiers so that, in view of the maximum duration of the video clip, segments including higher priority moments or scenes can be included in the video clip and lower priority moments or scenes are excluded from the video clip.

In an embodiment, the video clip is generated in view of prioritization rules in which either: a greater duration of fewer scenes is prioritized for inclusion in the video clip over a lesser duration of more scenes, or the lesser duration of more scenes is prioritized for inclusion in the video clip over the greater duration of fewer scenes.

In an embodiment, the at least one segment included in the video clip includes a moment associated with a high priority narrative classifier and a predetermined duration before the moment or a predetermined duration after the moment.

In an embodiment, the priority is determined by a support vector machine (SVM) or a decision tree ranking the narrative classifiers based on a narrative significance.

In an embodiment, the narrative map is generated based on thematic clustering in which related narrative elements are grouped.

In an embodiment, the related narrative elements correspond to a narrative theme found throughout the video content item, wherein the video clip is generated in dependence on the narrative theme.

In an embodiment, the processor is further configured to: identify, from the narrative map, a primary plot of the video content item. The video clip is generated in dependence on the primary plot.

In an embodiment, the one or more segments are selected for inclusion in the video clip when the one or more segments are central to the primary plot.

In an embodiment, a highest priority is assigned to a moment or scene in the video content item including an emotional climax.

In an embodiment, user input or a user profile indicates a preference for action scenes, wherein a highest priority is assigned to moments or scenes in the video content item including action.

DETAILED DESCRIPTION

Figure 1:
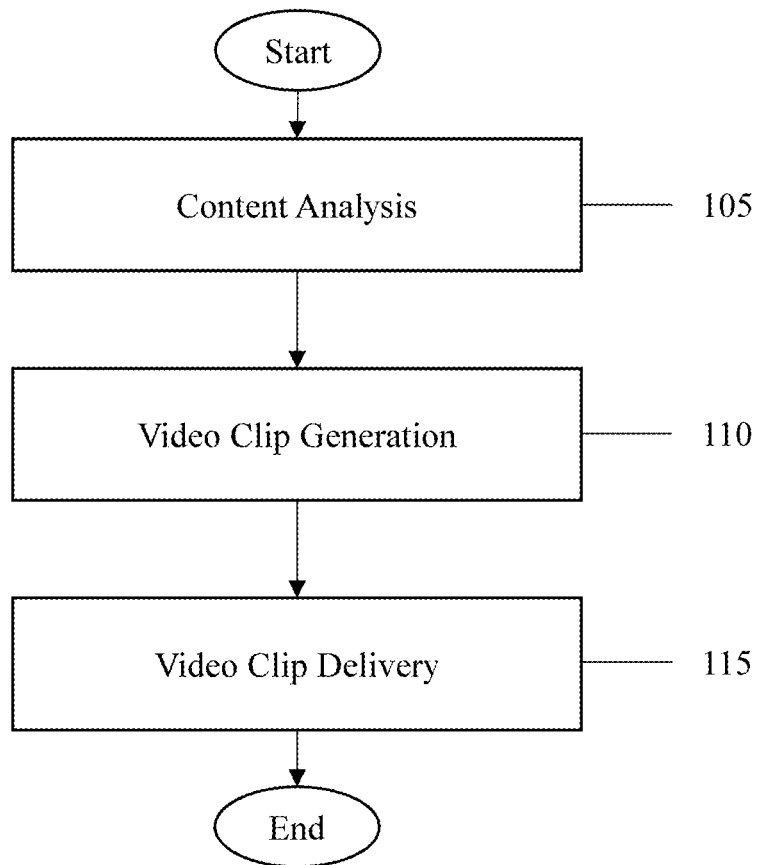
FIG. 1 shows a flowchart for generating and delivering a video clip of a video content item according to various exemplary embodiments.

The exemplary embodiments may be further understood with reference to the following description and the related appended drawings, wherein like elements are provided with the same reference numerals. The exemplary embodiments describe operations for generating a video clip that comprises a condensed or shortened version of video content that captures one or more desired narrative moments in the video content.

Some aspects of the present disclosure relate to features that may be referred to as "micro-bingeing" in which a streaming platform implements artificial intelligence (AI) to synthesize full-length video content into condensed video clips for delivery to a user. In some embodiments, the clips are personalized to the user based on user inputs and/or preferences such as, e.g., a maximum duration of the clip or narrative preferences.

Behind this user-centric design is a robust technical framework in which natural language processing (NLP) algorithms analyze dialogue and plot nuances by identifying key phrases and pivotal words that signal plot developments while image recognition technologies capture relevant visual moments by scrutinizing video frames, recognizing and interpreting visual elements such as character expressions and settings. Together, they create a comprehensive understanding of video content. The dual analysis ensures that key scenes are identified not just through dialogue or narration but also through visual cues, providing a comprehensive understanding of content significance. The content analysis marks timestamps for content identified as most resonant, ensuring that the narrative remains coherent, even though in a significantly condensed form.

After the content has been analyzed, a clip is generated taking into consideration constraints such as, e.g., a maximum clip duration. Key narrative moments are selected and segments of the video content are selected around the timestamps of these key narrative moments. The segments are then stitched into a clip and delivered to a user.

The present disclosure also relates to a recommendation functionality in which micro-binge clips are matched to user preferences and viewing habits so that personalized content may be created and/or so that existing content matching the user's preferences and viewing habits can be selected for recommendation.

The exemplary embodiments are described with regard to video content. The term "video content" as used herein may refer generally to long-form content such as a film or a television show made available, for example, for streaming by a video streaming service or other video streaming platform. The exemplary embodiments are generally directed to video content comprising a relatively long duration that, for some consumers of streaming media, may not be conveniently viewed in its entirety in a single viewing session (e.g., without pausing/restarting one or more times). However, it should be understood that the exemplary embodiments may be applied to any type of video content including short-form video content.

In general, a file package for a film, TV show, or other type of video content includes one or more video files, one or more associated audio files, one or more associated subtitle files (otherwise referred to as closed captioning (CC)), and/or various other associated files including information about the video content such as, e.g., metadata. The term "video content item" as used herein may refer generally to a discrete instance of video content (as presented to a user, e.g., a film or an episode of a show being streamed), may refer collectively to the file package that enables the presentation of the video content (including the video file(s), audio file(s), etc.), or may refer to the actual video (e.g., the collection of frames that make up the video content).

As would be understood by those skilled in the art, the video file(s) and the audio file(s) of a given video content item are synchronized for playback based in part on timestamping. The subtitle files(s) include a textual interpretation of the dialogue and sounds that are synchronized with the video/audio based in part on timestamping so that the text describing the dialogue/sounds appears overlaid on the video at the proper time, e.g., when these sounds are being conveyed in the audio. The subtitles/captions may be in a format such as SRT (SubRip Text) or VTT (Video Text to Track).

In various embodiments, artificial intelligence (AI) and/or machine learning (ML) analyses are performed on or in dependence on various files included in the file package of a video content item. In particular, an image recognition analysis is performed on one or more video files and a natural language processing (NLP) analysis is performed on one or more subtitle files. These content analyses are executed to identify relevant narrative moments from the video content item. However, it should be understood that additional information, e.g., information included in additional files in the file package or information from additional sources, can be analyzed as part of the AI/ML analyses.

The exemplary embodiments describe multiple different types of AI/ML functionalities to be described in detail below. Each AI/ML functionality may be directed to a specific task. Those skilled in the art understand that AI generally refers to computer-based systems and methods (e.g., algorithms) for simulating human intelligence. The term "AI" encompasses a wide range of techniques including, e.g., statistical methods and machine learning (ML) methods. Those skilled in the art understand that ML is a subset of AI and generally refers to computer-based systems and methods (e.g., algorithms) that learn from data to identify patterns and make decisions or predictions without explicit programming.

It is common for those skilled in the art to use the term "model" to refer to a single AI/ML technique or multiple AI/ML techniques used in combination (e.g., an "AI model," an "ML model," and/or an "AI/ML model" comprising one or more AI/ML techniques). In the present embodiments, the term "model," with regard to AI/ML, is not limited to any particular number of AI/ML techniques and should be understood to encompass one or more AI/ML techniques, such as, e.g., one particular category of AI/ML technique used in isolation; one particular category of AI/ML technique used as part of a larger AI/ML framework involving multiple categories of AI/ML techniques; multiple categories of AI/ML techniques used in combination; or multiple categories of AI/ML techniques used in combination as part of a larger AI/ML framework involving additional categories of AI/ML techniques.

Accordingly, the term "model" with regard to AI/ML should not be construed as limiting the described embodiments to any particular AI/ML technique or to any particular combination of AI/ML techniques except as described herein. To provide some illustrative examples, a natural language processing (NLP) model as described herein can include a number of distinct NLP techniques, an image recognition model as described herein can include a number of distinct image recognition techniques, and a content analysis model as described herein can collectively include the NLP model, the image recognition model, and additional AI/ML modeling techniques.

FIG. 1 shows a flowchart 100 for generating and delivering a video clip of a video content item according to various exemplary embodiments. The steps 105-115 in the example of FIG. 1 are described in a general manner to introduce a number of concepts to be explored in detail below.

In 105, a content analysis is run for a selected video content item. The content analysis can include a number of sub-steps employing a variety of AI/ML techniques for classifying the video content item in various ways relating to the narrative of the content. The video content item can be classified in many different ways, ranging from broad narrative themes of the video content item as a whole (e.g., genre/sub-genre) to narrow narrative moments in particular scenes (e.g., a climax of the narrative). The output of the content analysis phase comprises a data format that suitably captures a narrative flow of the video content item and associates narrative classifiers with timestamps corresponding to one or more frames of the video. In some embodiments, the output of the content analysis may be referred to as a "narrative map."

In 110, a clip of the video content item is generated based in part on the results of the video content analysis. The clip generation generally comprises a segmentation phase and a stitching phase that may be performed in coordination or as separate processing steps. The segmentation phase generally comprises the definition of segments within the video content item with each segment comprising a duration less than the duration of the entire video content item. Each segment in this embodiment is defined by a starting timestamp and an ending timestamp. The segmentation is performed in dependence on the content analysis of the video content item and can further include a number of additional sub-steps employing a variety of AI/ML techniques for defining portions of the video content item that can be used in a video clip. The stitching phase generally comprises stitching together multiple segments of the video content item into a video clip.

In 115, the video clip is delivered to a user. In some embodiments, the clip can be delivered on demand (e.g., by the user selecting the video content item and requesting the clip). In other embodiments, the clip can be made available for selection by any user, e.g., on a streaming service platform. In still other embodiments, the clip can be delivered to a particular user as a recommendation (e.g., based on user inputs, user preferences, and/or a user profile).

At various points in the above-described process, user preferences and/or inputs may be considered. The integration of user information is explored in greater detail below.

The video content analysis of step 105 generally comprises a language analysis and a video analysis. The language analysis relies on the subtitles (or closed captions (CCs)) of a video content item. The language analysis generally comprises a natural language processing (NLP) framework that includes various NLP techniques ranging from relatively basic techniques such as, e.g., tokenization and named entity recognition (NER), to more advanced techniques such as, e.g., deep learning and/or transformer based language classification, to be described in detail below.

It should be understood that, in alternative embodiments, the audio could be analyzed in a separate step, with dialogue, sounds, etc. provided as text, upon which the NLP can be performed. However, this may introduce unnecessary complexity for most applications of these exemplary embodiments.

The video analysis relies on the actual video file. The video analysis generally comprises an image recognition framework that includes various image analysis techniques and/or video analysis techniques ranging from relatively basic techniques such as, e.g., object detection, to more advanced techniques such as, e.g., deep learning based scene classification.

It should be understood that a video file is defined by attributes or parameters including a frame rate, a resolution, an aspect ratio, color information, and other attributes. An audio file is defined by attributes/parameters including a sampling frequency, a codec type, a number of channels (stereo vs. surround), and other attributes. The exemplary embodiments described herein are generally agnostic to the defining parameters of the files included in a file package for a video content item. In some cases, a video content item can be normalized, e.g., transitioned into a form having different attributes or parameters, prior to content analysis.

The output of the content analysis includes an association of narrative-related information with one or more timestamps. Those skilled in the art understand that the timestamps of a video content item can assume various formats, including {hours:minutes:seconds}, {hours:minutes:seconds:milliseconds}, or {hours:minutes:seconds:frames}.

The segmentation and stitching of step 110 is performed in dependence on the output of the content analysis. In particular, timestamps of the video content item are selected to define the segments. Timestamps can be selected for segmentation directly from the output of the content analysis (e.g., the content analysis can flag the start of a pivotal scene and the end of the scene, and the scene is segmented directly based on these flags), or the timestamps can be selected in dependence on the timestamps of the content analysis (e.g., a segment can extend from a predetermined amount of time prior to a certain narrative moment (such as an emotional climax) until a predetermined amount of time after the narrative moment).

It should be understood that a "segment" or "video segment" generally refers to a continuous portion of a video content item starting from a first timestamp within the video content item and ending at a second timestamp within the video content item. Additionally, a "clip" or "video clip" generally refers to multiple segments of the original video content item stitched into a new video content item.

It should be understood that the segment can be defined logically by its starting timestamp and ending timestamp within the video content item. In other words, in some cases, the segment is not yet cut into a clip of the video content item. In other cases, a segment can be cut into a clip of the video content item (or part of a clip comprising multiple segments stitched together) comprising the duration beginning at the starting timestamp and ending at the ending timestamp. The term "segment" can refer to either case without introducing any ambiguity except where explicitly stated otherwise.

To provide one illustrative example, a first segment can comprise a duration of 5 minutes and include continuous video content from a first timestamp t1={00:15:00:00} to a second timestamp t2={00:20:00:00} and a second segment can comprise a duration of 10 minutes and include continuous video content from a first timestamp t1={00:30:00:00} to a second timestamp t2={00:40:00:00}. A video clip comprising a duration of 15 minutes can be generated to include the first segment and the second segment.

In various aspects of the present disclosure, a comprehensive narrative analysis is performed to identify narrative-related information such as, e.g., key narrative arcs, character interactions, and thematic elements.

It should be understood that a full narrative analysis can be performed in stages. Initial analysis can be conducted during the content analysis phase, where key elements are identified and annotated. Additional narrative analysis can be performed during the video segmentation phase, where various clip generation constraints and/or user inputs/preferences are considered to further refine the understanding and presentation of the narrative.

It should be understood that the narrative of video content can be defined and/or classified in a number of different ways depending on a huge number of factors across countless different genres and sub-genres. To provide some illustrative examples, different genres of video content that can form the basis of a classification of the video content include: comedy; drama; action; adventure; science fiction; fantasy; horror; thriller; suspense; romance; etc. The television format includes additional genres/sub-genres including: sitcom; medical drama; crime drams; anthology; etc. Multiple different sub-genres can be defined within a genre.

Some video content follows common tropes that can be found across many genres and/or narrative formats. To provide one illustrative example, an action/adventure film can be broadly classified as a Hero's Journey where the narrative arc proceeds according to a general template in which a main character is called to adventure, commits to the adventure, embarks on the adventure, overcomes obstacles, faces a significant challenge, overcomes the challenge, receives a reward, and journeys back to the ordinary world. Various common narrative elements/themes can be found in video content across genres or within specific genres. Other video content comprises a more experimental or avant-garde narrative format that defies simple classification such as described above.

Different types of narratives may include different types of acts/scenes having varying levels of narrative importance. For example, in the Hero's Journey, the climax of the narrative may be the part where the main character overcomes the significant challenge. This may be considered by some to be the most important aspect of the narrative (although others may define narrative importance differently).

Accordingly, particular scenes within a video content item can be classified in various ways according to a priority defined with regard to narrative importance. Additionally, within a particular scene, particular moments can be classified in various ways. The importance of a particular moment, particular scene, etc., is generally a subjective determination that can vary from person to person, between particular groups of people, etc. Accordingly, the exemplary AI/ML framework can be tuned to prioritize various narrative elements in different ways.

As shown above, the classifications associated with a video content item and with particular segments within the video content item can be numerous. In the individual NLP and image recognition processes, in the harmonization of these analyses, and/or in the segmentation/clip generation steps, the narrative-related classifications can directly or indirectly indicate a priority associated with the narrative. For example, a higher priority aspect of the narrative may be a climax or an action scene. The prioritization of particular narrative moments over others can be relatively simple and can apply to different types of narratives, or the prioritization can be specific to a certain narrative format. The rules of the narrative analysis and/or prioritization can be refined in reinforcement learning based on, e.g., user profiles/preferences.

Figure 2:
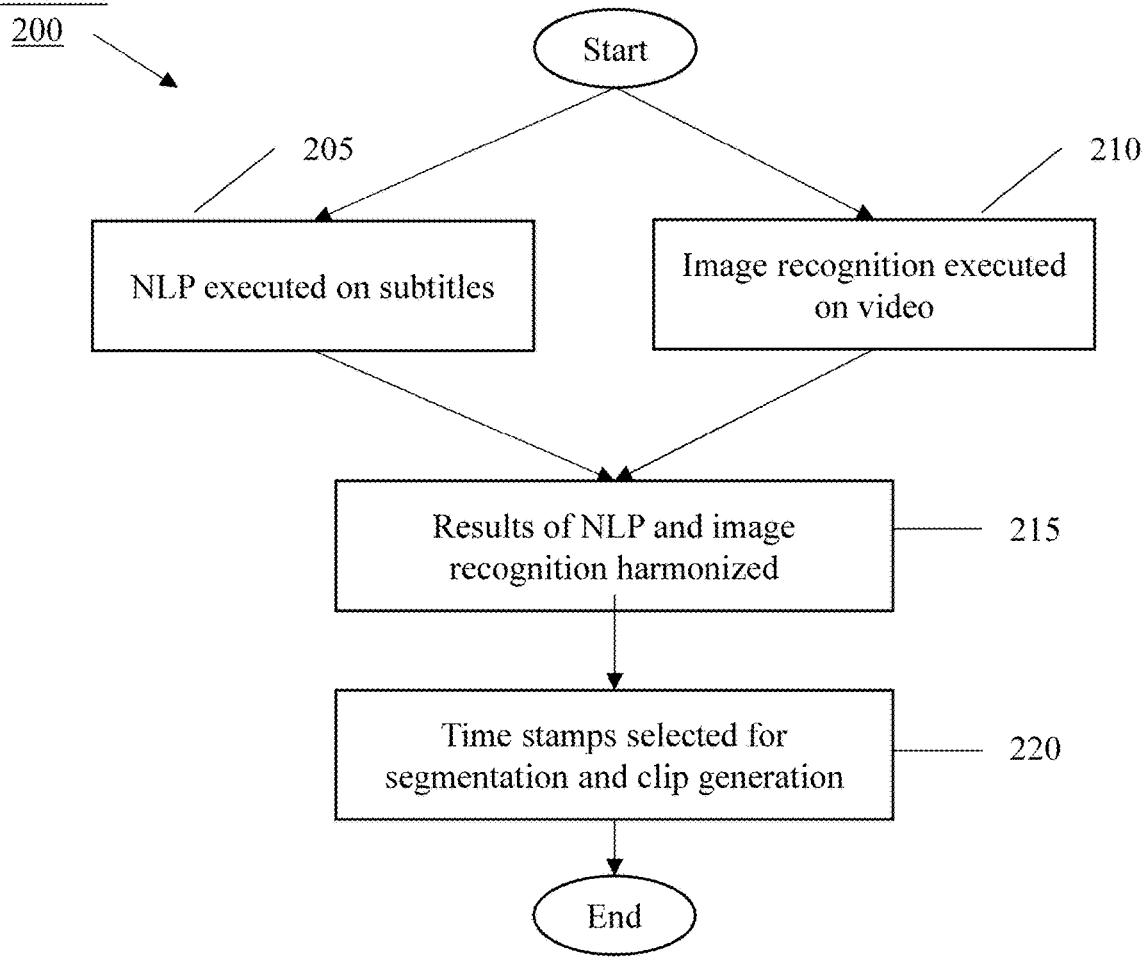
FIG. 2 shows a flowchart for a narrative analysis of a video content item according to various exemplary embodiments.

FIG. 2 shows a flowchart 200 for a narrative analysis of a video content item according to various exemplary embodiments. The video content item includes a video file, an audio file and a subtitle file.

In 205, one or more subtitle files is used as input for a NLP inference model. The NLP model can comprise a combination of neural network-based and transformer-based models for analyzing the narrative flow of subtitles. Specifically, recurrent neural networks (RNN), long short term memory (LSTM) networks, convolutional neural networks (CNN), Bidirectional Encoder Representations from Transformers (BERT) models, and generative pre-trained transformer (GPT) models can be employed to capture the temporal dynamics, context, and key plot points of the narrative. Techniques such as dialogue analysis, thematic analysis, and event detection can be used to identify and extract significant moments from the subtitles, ensuring a comprehensive understanding of the narrative flow of the content. The classifications of the NLP model can identify key phrases, plot points, thematic elements, etc. The generation of the NLP model, e.g., training the model, is described in greater detail below.

The output of the NLP inference model is a set of timestamps, each associated with metadata that includes classifications and/or annotations related to the narrative essence of the video content item, as revealed in the subtitles. This metadata may include, e.g., key phrases and plot points, character interactions and significant dialogues, and/or thematic elements and emotional tones identified from the CCs or, if desired, derived from the audio dialogue itself.

Figure 3A:
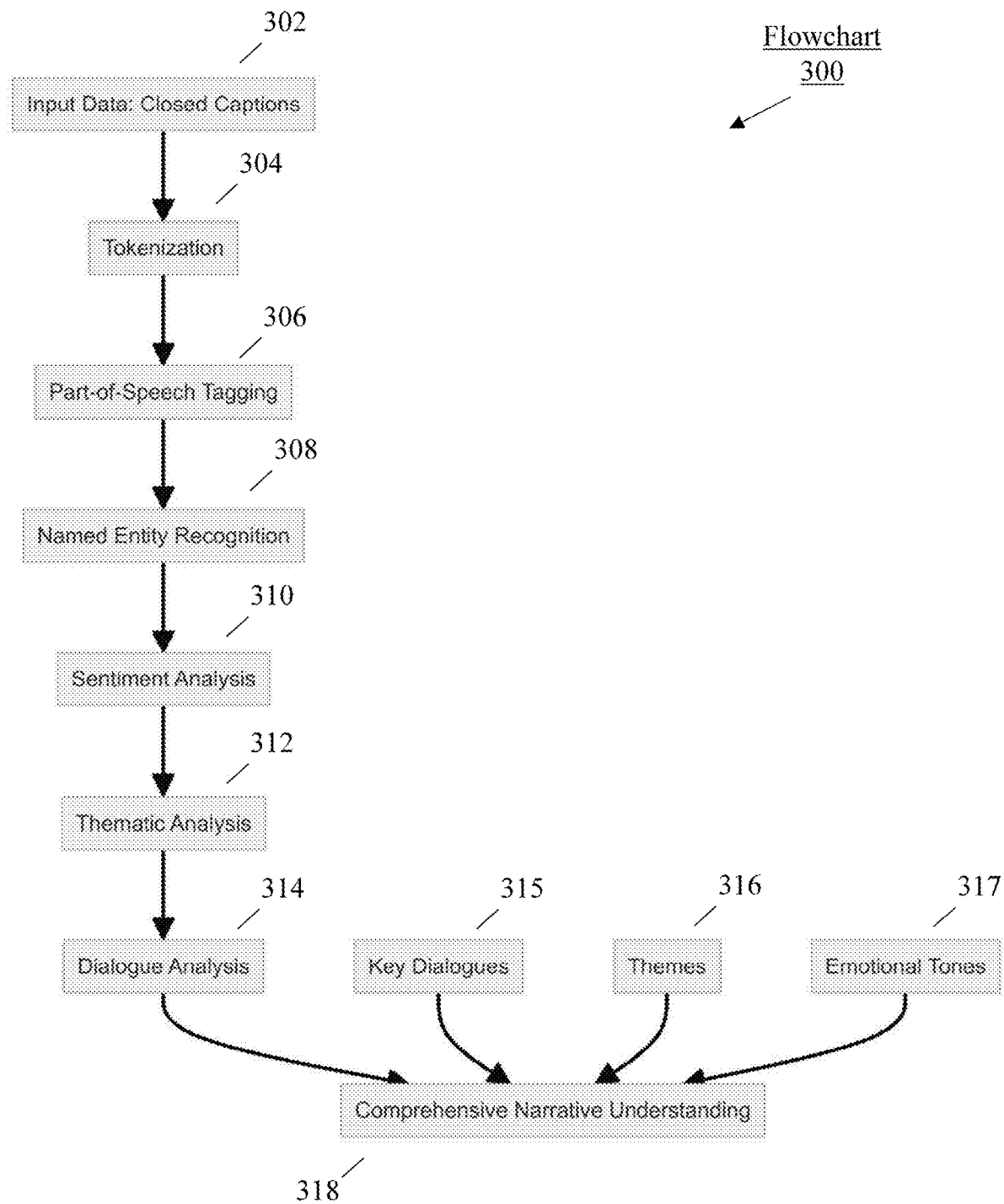
FIG. 3a shows a flowchart for a narrative analysis by natural language processing (NLP) of a closed caption file of a video content item according to various exemplary embodiments.

FIG. 3a shows a flowchart 300 for a narrative analysis by natural language processing (NLP) of a closed caption file of a video content item according to various exemplary embodiments. The flowchart 300 is described relative to an example video content item comprising an episode of Star Trek.

In 302, a closed caption file is used as input data (e.g., the episode of Star Trek is selected for analysis). In 304, tokenization breaks down the text into words and phrases (e.g., for the closed caption "I am the Captain of the Starship Enterprise," tokenization produces ["I", "am", "the", "Captain", "of", "the", "Starship", "Enterprise"]. In 306, part-of-speech tagging assigns grammatical tags to each token (e.g., tagging "Captain" as a noun and "am" as a verb in the sentence).

In 308, named entity recognition identifies entities like names, locations, and dates (e.g., recognizing "Starship Enterprise" as an entity and "Captain" as a title). In 310, sentiment analysis determines the sentiment of dialogues (e.g., analyzing the sentence "This mission is a disaster" and identifying it as negative sentiment). In 312, thematic analysis identifies recurring themes in the text (e.g., detecting themes of leadership and exploration in "Star Trek: Picard" dialogues). In 314, dialogue analysis examines key conversations for narrative importance (e.g., analyzing a critical conversation between Picard and a crew member about a mission's ethics).

In 318, a comprehensive narrative understanding of the closed captions is generated by combining insights from the dialogue analysis (key dialogues 315), the thematic analysis (themes 316) and the sentiment analysis (emotional tones 317) to form a complete narrative picture and understand the narrative arc of the video content item.

As shown above, some narrative analysis is conducted solely based on NLP. This includes identifying key dialogues, significant plot points, and thematic elements directly from the text in the subtitle/CC files (or from analysis of the audio information (including dialogue, background noise, etc.). A more comprehensive narrative analysis can be performed after harmonizing the NLP output with the output of the image/video recognition analysis.

In 210, one or more video files is used as input for an image/video recognition inference model. The image recognition model can identify objects, faces, scenes, etc. The classifications of the image recognition model can include character expressions, types of scenes (action scene, etc.), setting, etc.

In some embodiments, Convolutional Neural Networks (CNNs) and supervised learning techniques are utilized for image recognition. The primary techniques include object detection, facial detection and recognition, scene classification, and event detection. These methods collectively ensure a comprehensive understanding of the narrative flow by accurately identifying and classifying key visual elements within the video content.

In some embodiments, object detection and/or classification can include the identification and classification of objects within frames. In some embodiments, facial detection and/or recognition can include the detection of characters and the classification of their emotions. In some cases, the system can identify the actor(s) in a scene.

In some embodiments, object tracking can track objects and/or characters across video sequences to understand their movements and interactions. In some embodiments, scene classification can include categorizing scenes by type and context. In some embodiments, event detection can include identifying significant events and actions within the video.

The output of the image recognition generally comprises timestamps associated with significant visual elements and corresponding metadata, including classifications and annotations related to the visual narrative essence. This metadata may include detected objects and their classifications; recognized faces and classified emotions; identified scenes and their context; and/or significant events and actions.

Figure 3B:
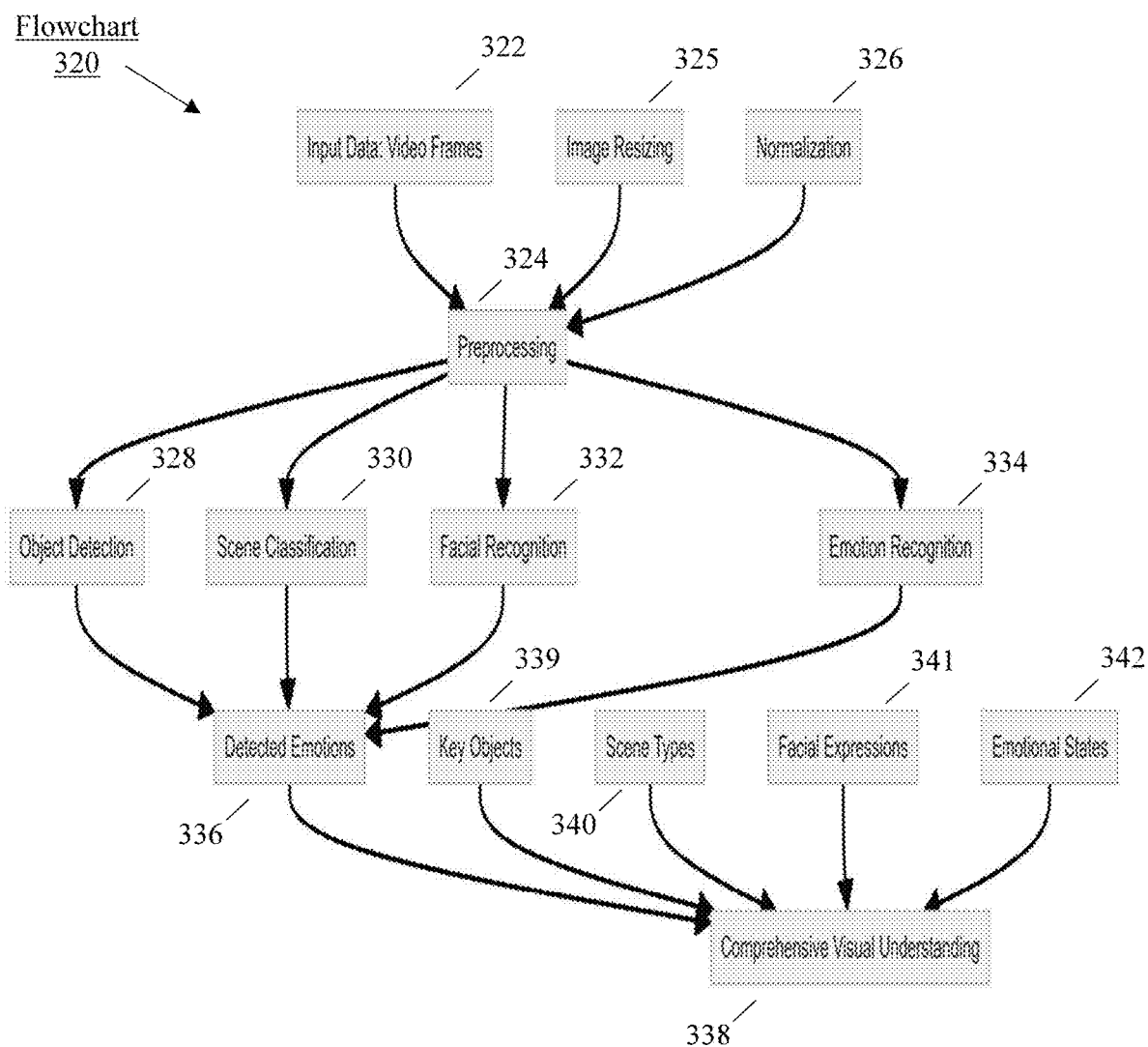
FIG. 3b shows a flowchart for a narrative analysis by image recognition of a video file of a video content item according to various exemplary embodiments.

FIG. 3b shows a flowchart 320 for a narrative analysis by image recognition of a video file of a video content item according to various exemplary embodiments. The flowchart 320 is described relative to the example video content item of FIG. 3a comprising an episode of Star Trek.

In 322, a video file is used as input data (e.g., the episode of Star Trek is selected for analysis). In 324, preprocessing the video file includes image resizing 325 and normalization 326. The image resizing 325 and normalization 326 is performed for consistency across differently sized video files and for model compatibility (e.g., resizing frames to 224× 224 pixels and normalizing pixel values to a range of 0 to 1).

In 328, object detection identifies and classifies objects within frames (e.g., detecting objects like "spaceship" and "laser" in a battle scene). In 330, scene classification classifies scenes by type (e.g., classifying a scene as "action" or "drama" based on visual cues). In 332, facial recognition identifies characters' faces (e.g., recognizing "Michael Burnham"). In 334, emotion recognition detects emotions on faces (e.g., identifying fear or determination on a character's face during a tense scene).

In 336, emotions are detected based on the output of 328-334. In 338, a comprehensive visual understanding of the video file is generated by combining key objects 339, scene types 340, facial expressions 341 and emotional states 342 (e.g., to comprehend a dramatic encounter).

As described above, some initial narrative analysis can be performed based solely on image recognition including identifying key objects, character appearances, emotions, and significant scenes. In some embodiments, a comprehensive narrative analysis can be performed after combining the image recognition output with the NLP output.

In 215, the results of the NLP and image recognition are harmonized to create a unified narrative map. In some embodiments, the NLP and the image recognition are performed separately and their outputs (e.g., time stamps) are combined and harmonized in post-processing steps. Each technique generates its own set of timestamps and metadata, which are then compared and integrated to create a unified understanding of the narrative flow.

In other embodiments, some initial NLP and image recognition are performed separately and then combined prior to final timestamp generation. For example, dialogue analyzed by NLP can be associated with characters identified by image recognition. This pre-harmonization can enhance the accuracy of detecting key narrative moments. In another example, the image-based event detection can be supplemented by the NLP analysis to provide context for detected events, e.g., to detect significant events and actions within the video content, such as confrontations, discoveries or resolutions.

In one example, NLP identifies a pivotal portion of dialogue where a character makes a critical decision while image recognition detects the presence of the character and captures emotional expressions during the decision-making scene. To harmonize the outputs, the dialogue is associated with the visuals. The timestamps corresponding to the portion of dialogue are matched to the corresponding visual scene to ensure that the character identified in the dialogue is the same as the one detected in the video frame. A combined timestamp is generated that includes both the selected portion of dialogue and the associated visual elements, ensuring a cohesive understanding of the narrative moment. The harmonized data is used to understand the full context of the scene.

In some embodiments, to enhance the narrative analysis, additional AI/ML techniques are employed to harmonize the NLP and image recognition outputs. These techniques can include sentiment analysis, thematic clustering, and/or reinforcement learning. Sentiment analysis can be used to further analyze the emotional tone of scenes and dialogue. Thematic clustering can be used to group related narrative elements and ensure coherent storytelling in generated clips. Reinforcement learning can be used for continuously improving content recommendations based on user feedback.

Figure 3C:
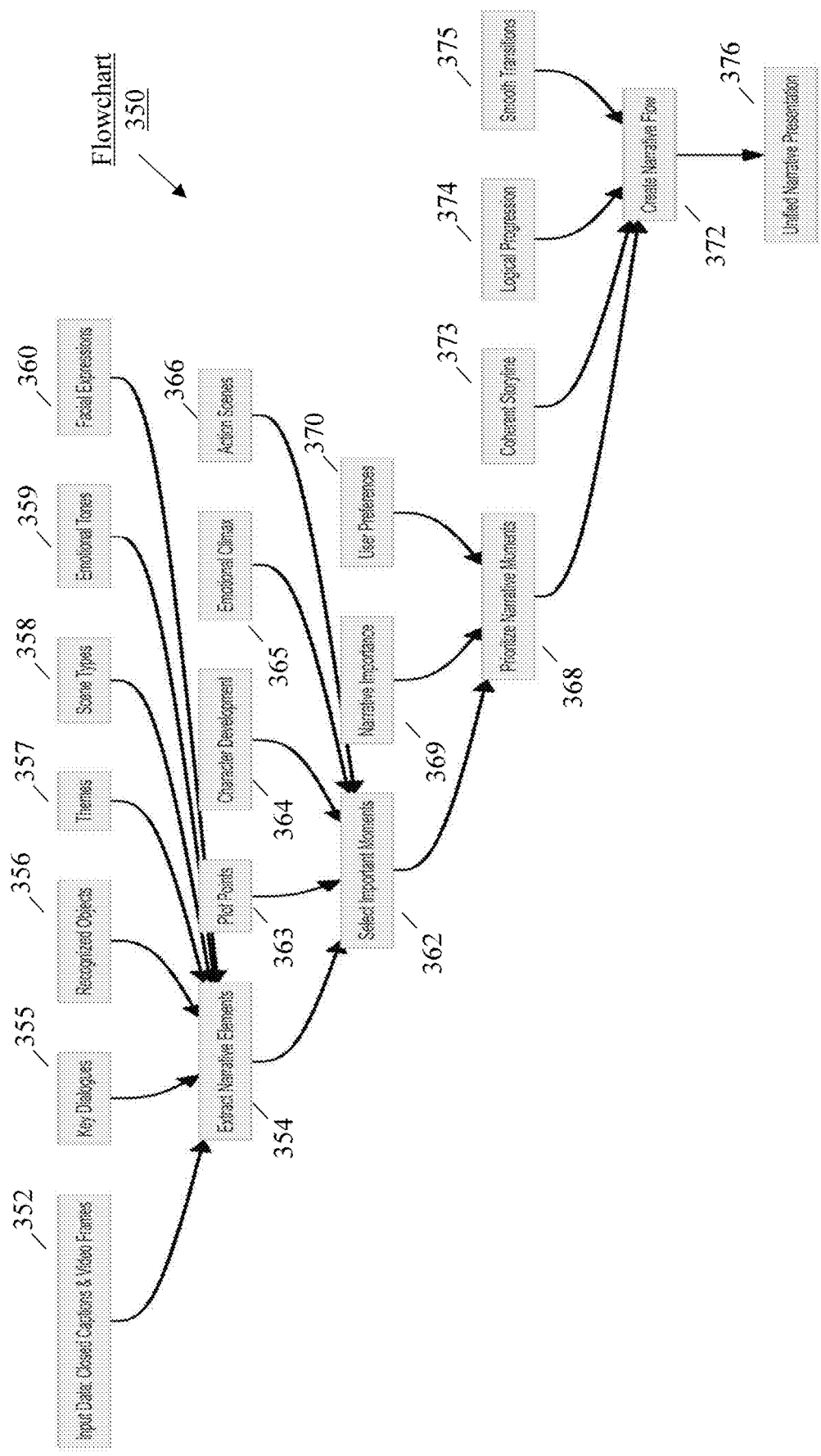
FIG. 3c shows a flowchart for a unified narrative analysis of a video content item according to various exemplary embodiments.

FIG. 3c shows a flowchart 350 for a unified narrative analysis of a video content item according to various exemplary embodiments. The flowchart 350 includes aspects from the flowcharts 300, 320 of FIGS. 3a-b described above and further includes additional processing steps for combining the narrative analyses and harmonizing the understanding of the narrative.

In 352, a closed caption file and a video file of the video content item is used as input data. In 354, narrative elements are extracted from the NLP and image recognition analyses. Extracting the narrative elements can include collecting key dialogues (355), recognized objects (356), themes (357), scene types (358), emotional tones (359), and facial expressions (360), as described above in FIGS. 3a-b (e.g., extracting a critical dialogue about a character's dilemma, recognizing a spaceship in the background, identifying themes of sacrifice, classifying the scene as dramatic, and noting the emotional tone as tense).

In 362, important moments are selected. Selecting important moments can include identifying critical plot points (363), character development scenes (364), emotional climaxes (365), and/or action scenes (366) (e.g., selecting a pivotal moment where the character makes a crucial decision, focusing on scenes that develop the protagonist's arc, highlighting the climax of the conflict, and incorporating high-energy action sequences).

In 368, narrative moments are prioritized. Prioritizing narrative moments can include assigning priority based on narrative importance (369) and/or user preferences (370) (e.g., giving higher priority to scenes with significant character development and aligning with the user's preference for action and drama). The prioritization functionality, including the definition of prioritization rules, is explored in greater detail below.

In 372, a narrative flow is created. Creating the narrative flow can include arranging selected moments into a coherent storyline (373) with logical progression (374) and smooth transitions (375) (e.g., creating a narrative flow that seamlessly transitions from character introspection to an action-packed confrontation, ensuring the storyline is engaging and easy to follow). In 376, a unified narrative presentation is created.

In one illustrative example, an episode of "Star Trek: Picard" is analyzed. A dialogue analysis extracts key conversations where characters discuss their mission to save an old friend and the moral dilemmas they face (key dialogue: "Sometimes we must take the hardest path to do what's right"). A visual analysis detects visual elements such as a tense negotiation between Picard and an antagonist and the visual grandeur of space battles. An event detection identifies a crucial plot point where Picard decides to confront an old enemy (Event: "Picard decides to meet the Romulan leader face to face."). A sentiment analysis highlights the emotional tension in a confrontation scene (Sentiment: Negative sentiment detected with high intensity during a standoff).

In a thematic analysis, topic modeling identifies themes of duty, sacrifice, and redemption (Themes: Duty to protect the Federation, personal sacrifice for the greater good, seeking redemption for past actions) and character arc mapping tracks Jean-Luc Picard's journey from a retired admiral to reengaging in active space missions (Character Development: From introspective and retired to decisive and action-oriented). In a scene classification, scene detection classifies the confrontation on the Romulan ship as an action-drama scene (Classification: Action-drama due to the intense dialogue and strategic maneuvers).

Combining and prioritizing narrative elements includes temporal alignment aligning the detected dialogues and visual elements chronologically to maintain narrative flow (Example: The negotiation scene is placed before the space battle to build tension and context). A contextual correlation correlates emotional dialogues with corresponding visual scenes (Example: The dialogue "Sometimes we must take the hardest path" is paired with Picard's resolute expression). A priority assignment prioritizes the negotiation and battle scenes as they are central to the episode's plot (Example: High priority is given to scenes that drive the main storyline forward, such as the strategic planning and the final showdown).

The output of the harmonization can comprise various forms but generally includes a set of relevant time stamps with associated metadata that can be considered during the clip generation phase. In various embodiments, the content analysis can be tuned to output timestamps related to broad narrative themes, narrow narrative themes, or any combination of narrative themes with any degree of granularity.

In some embodiments, narrative features of the video content item can be associated with a single timestamp. For example, a given timestamp 't' can be associated with the start of a scene, the end of a scene, the start or end of a crucial event, a narrative peak (e.g., a gunshot), etc. In other embodiments, narrative features of the video content can be associated with multiple timestamps. For example, a starting timestamp 't1' can be associated with the start of a scene/ event and an ending timestamp 't2' can be associated with the end of the scene/event. In still other embodiments, portions of the video content such as a particular scene can be associated with more than two timestamps, e.g., the start of the scene, the start of an important narrative moment within the scene, the end of the narrative moment, and the end of the scene. This breakdown of a scene can facilitate the segmentation/stitching of a clip, in particular, where the maximum duration for the clip is relatively short such that some scenes cannot be portrayed in their entirety without sacrificing the inclusion of other parts of the video content.

In 220, time stamps are selected for segmentation and clip generation. In some embodiments, the segmentation step and the clip generation step are performed in coordination, e.g., segments are defined such that only the defined segments are stitched together to generate the clip. In some embodiments, the time stamps corresponding to a segment (e.g., a starting time and an ending time) are selected from the set of relevant time stamps. However, this is not required. In some embodiments, the segmentation and the clip generation are performed together while in other embodiments the segmentation and the clip generation are performed separately.

Considering the ultimate goal of condensing a content item into a shortened version of itself, it naturally follows that some of the content included within the content item is prioritized over other content.

Some or all of the sub-steps of 220 can include a partial narrative analysis so that the narrative moments may be prioritized for inclusion in a clip as will be described in greater detail below. In some embodiments, this partial narrative analysis can be performed independently of user inputs/preferences. In other embodiments, this partial narrative analysis is dependent on/influenced by user input/preferences. For example, the segmentation and the clip generation can be constrained by various user inputs as will be described in detail below. During video segmentation, a scene may be further analyzed in the context of user preferences to ensure it fits well within a personalized microbinge session.

The output of the step 220 comprises instructions for generating element(s) for inclusion in a clip so that these elements can be provided to a stitching module for production of the clip.

The language analysis generally comprises natural language processing (NLP) for analyzing the narrative flow of the closed captioning/subtitles associated with the video content. Those skilled in the art understand that the term "NLP" can encompass a variety of techniques.

The exemplary embodiments are described with regard to natural language processing (NLP) of a subtitle/CC file of a video content item to determine relevant narrative moments from the dialogue and/or sounds captured in the subtitles. The NLP architecture can include a number of distinct AI/ML techniques performed on the text of the subtitle file. The NLP techniques can include relatively simple NLP techniques such as, e.g., tokenization, etc., more advanced NLP techniques such as, e.g., deep learning and/or transformer-based classification, etc.

The NLP techniques can comprise a combination of neural network-based and transformer-based models for analyzing the narrative flow of closed captions. Specifically, RNNs, LSTMs, CNNs, BERT, and GPT models can be employed to capture the temporal dynamics, context, and key elements of the narrative. Additionally, techniques such as dialogue analysis, thematic analysis, and event detection can be used to identify and extract significant moments (e.g., based on information from the closed captions) to ensure that the clip provides a comprehensive understanding of the narrative flow of the content.

In one aspect, training data for the NLP model comprises a corpus comprising labeled inputs/outputs from a diverse set of closed captions from various TV shows and movies. The closed captions can be pre-processed by NLP techniques including text cleaning, tokenization, part-of-speech (POS) tagging and named entity recognition (NER).

Text cleaning can include removing unnecessary elements such as special characters, formatting tags, extraneous symbols and/or timestamps that are not needed for text analysis. The remaining dialogue is clean and suitable for additional analysis.

Tokenization can include the cleaned text being split into tokens, which can be individual words or phrases, e.g., tokenizing the dialogue "I am the President of the United States" into ["I", "am", "the", "President", "of", "the", "United", "States" ].

POS tagging can include assigning a grammatical tag (such as noun, verb, adjective) to understand the grammatical structure of the sentences, e.g., tagging "President" as a noun and "am" as a verb in the sentence "I am the President."

NER can include identifying and classifying entities mentioned in the text into predefined categories such as the names of characters, locations, and dates, e.g., recognizing "United States" as a location and "President" as a title in "I am the President of the United States."

The NLP model can be trained on this pre-processed data using techniques including word embeddings and transformer models to capture semantic meanings. In some cases, a model can be pre-trained using an NLP service such as, e.g., Spacy. These models can be fine-tuned using labeled domain-specific closed caption data. Additional layers can be added to the model to improve its accuracy in identifying plot points and key phrases specific to entertainment content.

To analyze the narrative flow of the CC/subtitles, the NLP architecture can include various NLP techniques. In some embodiments, a neural network (NN)-based ML model/architecture is used. The NN-based architecture can, in some embodiments, comprise one or more of an RNN, an LSTM, and/or a CNN.

In one aspect, an RNN is used for processing sequences of text to capture the temporal dynamics and context of the narrative, for example, to understand the flow of conversation and plot progression. In another aspect, an LSTM (a type of RNN) is used to handle long-term dependencies in the narrative, providing better context retention over longer sequences relative to standard RNNs, e.g., maintaining context across multiple scenes. In another aspect, a CNN is used to extract hierarchical features from text. This is particularly useful for detecting key phrases and significant events within the captions.

In some embodiments, a transformer-based ML model/architecture is used. The transformer-based ML architecture can, in some embodiments, comprise a BERT or a GPT. In one aspect, a BERT is used for understanding the context of words in a sentence bidirectionally, improving the detection of key plot points and thematic elements within the CCs. In another aspect, a GPT can be used to improve the flow of dialogue and events by processing text in a sequential manner. For example, the GPT can fill gaps in the dialogue analysis and predict future narrative developments based on current context.

The NLP techniques can include a dialogue analysis for analyzing conversations between characters to identify significant interactions, character development, and plot advancements. The dialogue analysis includes preprocessing a subtitle file by tokenization, part of speech tagging and named entity recognition. The dialogue analysis can include NLP models such as RNNs for processing sequences of dialogue in view of the preprocessing steps to maintain context over time. The dialogue analysis can also include BERT for processing sequences of dialogue bidirectionally in view of the preprocessing to capture nuance and meaning. The dialogue analysis can include a contextual analysis to identify context and nuances regarding an importance of the dialogue, e.g., conversations that resolve conflicts or reveal character motivations are flagged as critical. In one example, the contextual analysis can understand the word "bank" contextually in sentences like "He went to the bank to deposit money" (financial institution) versus "He sat on the river bank" (side of a river). The dialogue analysis can further include an emotion analysis to identify the emotional tone of conversations. The dialogue analysis can further include keyword extraction to identify words or phrases that indicate significant narrative elements, e.g., "I love you," "I'm leaving," or "We need to talk."

These techniques help to pinpoint critical moments in the narrative that contribute to the story's progression, e.g., pivotal conversations, emotional climaxes, character-driven plot points, character confrontations, revelations, or emotionally charged interactions.

The NLP techniques can include a sentiment analysis for determining the sentiment expressed in the dialogues, whether positive, negative, or neutral, e.g., analyzing the sentence "This is a disaster" and categorizing it as having a negative sentiment.

The NLP techniques can include a thematic analysis for identifying recurring themes and motifs that provide a deeper understanding of the narrative's underlying messages and emotional tone. The thematic analysis can include text classification. Topic modeling can use algorithms like Latent Dirichlet Allocation (LDA) to categorize dialogues into themes based on word co-occurrence patterns, e.g., identifying themes of "family loyalty" and "betrayal". Sentiment analysis can analyze the sentiment expressed in dialogues to understand the emotional tone and recurring themes. NLP models such as GPT can predict and classify themes by generating text based on learned patterns, helping to identify subtle thematic elements. This helps in understanding the underlying messages and themes of the content, e.g., love, conflict, betrayal, redemption, friendship, etc., allowing for better segmentation and summarization in the clip of the narrative of the content as a whole. Themes are identified by analyzing the frequency and context of related words and phrases and motifs are identified by finding recurring symbols or actions that reinforce the themes, e.g., a repeated mention of a family heirloom indicating a theme of legacy.

The NLP techniques can include event detection for detecting significant events such as plot twists, climactic moments, and key turning points in the story. This technique ensures that the most impactful and engaging parts of the narrative are captured in the micro-binge clips, e.g., detecting the event "proposal" in the sentence "He proposed to her last night."

The content analysis techniques can include event detection by combined image recognition and NLP. The image recognition can include a video frame analysis to detect significant visual elements like characters, objects, and actions and a scene detection to identify scene changes and significant visual events that indicate plot progression, e.g., a car chase, a wedding or a fight scene. The NLP can include event extraction to identify events described in dialogues, such as "He proposed," "She left," or "They fought." The visual and textual data can be combined to understand the significance of events within the narrative context.

Pre-trained models can be used for initial pre-processing steps such as tokenization, part-of-speech tagging, dependency parsing, and named entity recognition (NER). These models provided a robust foundation for understanding the basic structure and entities within the closed captions. In some embodiments, a service such as SpaCy can provide a framework for training custom NLP models using domain-specific corpora.

The corpus comprises a large dataset of subtitles/CCs from various TV shows and movies. A diverse dataset from a wide variety of video content ensures the model is well-versed in the language and context typical of entertainment content.

The training of the NLP model comprises several NLP techniques including tokenization, part-of-speech tagging, dependency parsing, named entity recognition (NER) and text classification. Tokenization refers to breaking down the text into individual tokens (words or phrases). Part-of-Speech Tagging refers to identifying the grammatical parts of speech in the text. Dependency parsing refers to understanding the syntactic structure of the sentences. Named Entity Recognition refers to identifying key entities such as character names, places, and significant objects. Text Classification refers to categorizing text segments based on their thematic content and relevance to the narrative.

The output of the NLP model training is a trained NLP model capable of identifying key phrases and plot points in closed captions.

Figure 4A:
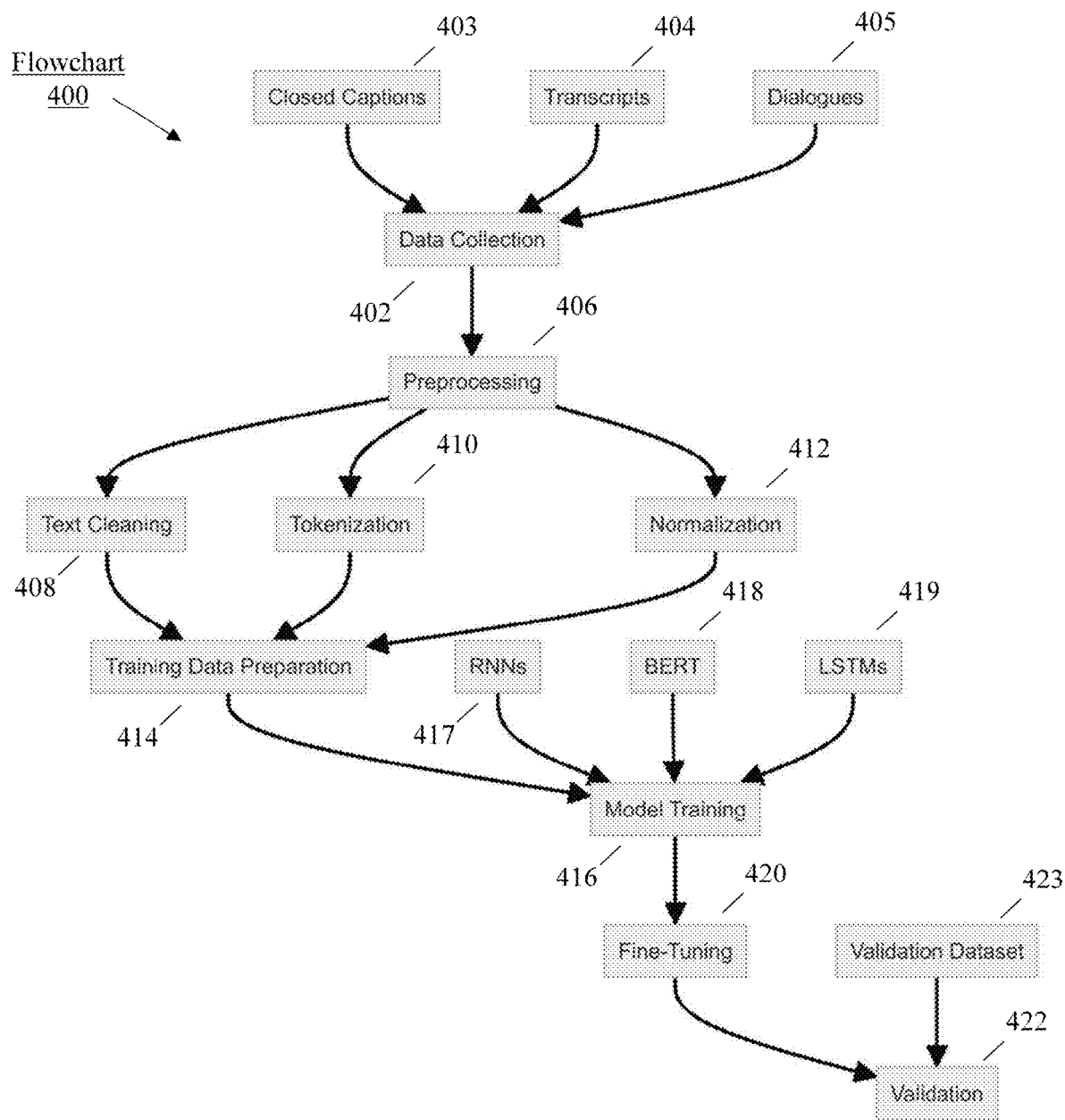
FIG. 4a shows a flowchart for training a NLP model for narrative analysis according to various exemplary embodiments.

FIG. 4a shows a flowchart 400 for training a NLP model for narrative analysis according to various exemplary embodiments. In 402, data is collected including closed captions (403), transcripts (404) and/or dialogues (405). The data collected in 402 can include any number of text files corresponding to any number of video content items. In one example, closed captions are collected from a first type of video content and dialogues are collected from a second type of video content including narrative themes substantially different from the first type. In 406, the data is preprocessed. The preprocessing can include text cleaning (408), tokenization (410) and normalization (412).

In 414, training data is prepared from the preprocessed data. In 416, the NLP model is trained on the training data. The NLP model can include one or more RNNs (417), BERTs (418) and/or LSTMs (419). One or multiple of these NLP modeling techniques can be selected for use.

In 420, the trained NLP model is fine-tuned. In 422, the trained and fine-tuned NLP model is validated using a validation dataset (423). The validation dataset can correspond to a text file corresponding to one or more video content items, e.g., a third type of video content including narrative themes substantially different from the first and second types.

For the inference phase, the subtitles of the video content are pre-processed by tokenization and tagging. The primary input to the NLP inference model is the subtitle/closed caption (CC) file associated with the video content. It should be understood that dialogue found in the CCs comprises the primary content for analyzing the narrative. However, text describing non-dialogue sounds such as background noises, sound effects, music, etc., can also be analyzed. In some embodiments, the input can further include metadata from the video and audio files to enhance context understanding.

Figure 4B:
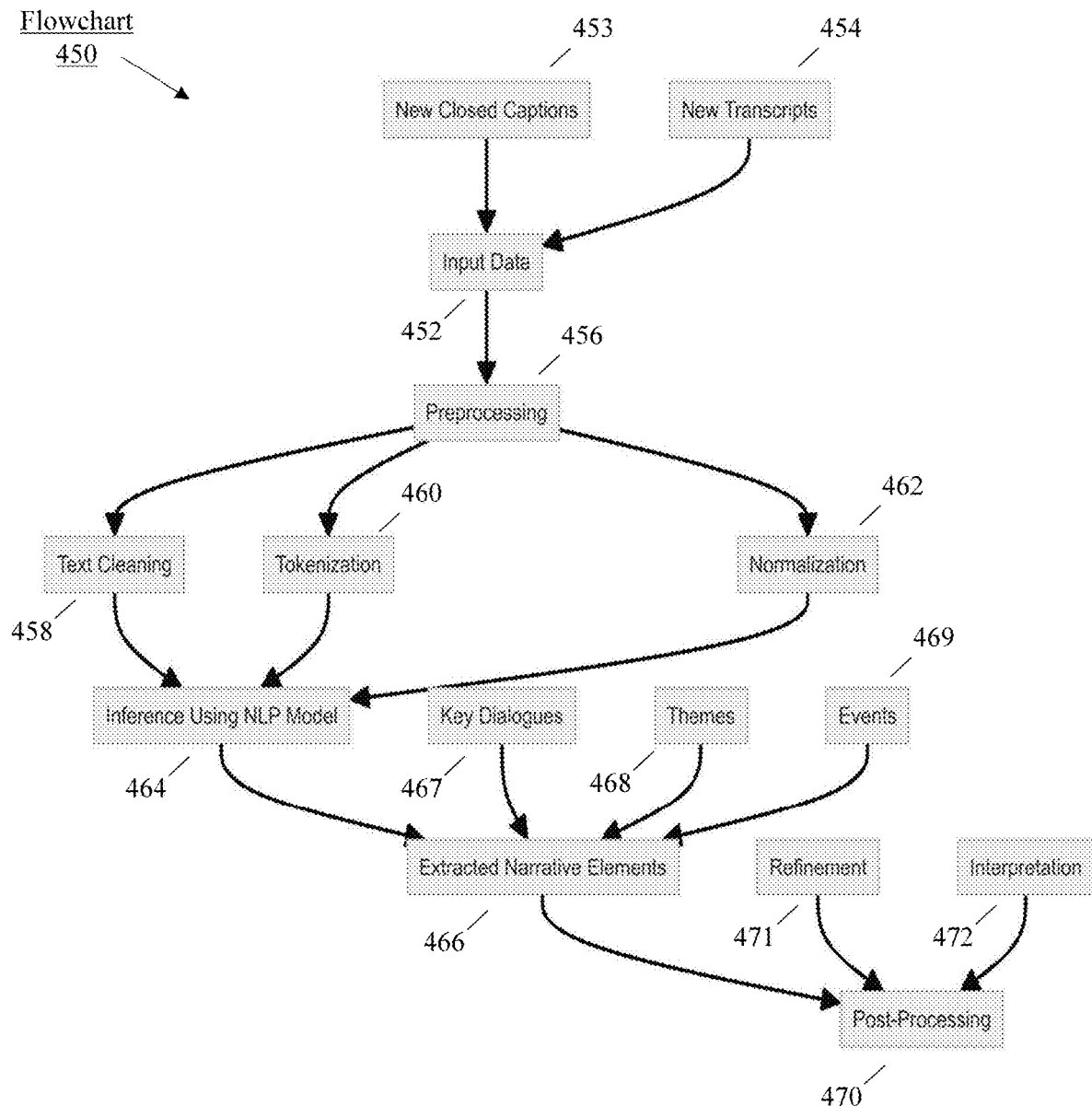
FIG. 4b shows a flowchart for applying a trained and validated NLP model according to various exemplary embodiments.

FIG. 4b shows a flowchart 450 for applying a trained and validated NLP model according to various exemplary embodiments. In 452, input data is received and/or loaded for a video content item, the input data comprising closed captions 453 and/or transcripts 454. The captions may be in a format such as SRT (SubRip Text) or VTT (Video Text to Track).

In 456, the input data is preprocessed by text cleaning 458, tokenization 460 and normalization 462.

In 464, the selected NLP model is executed with the preprocessed data as input. The inference model extracts narrative elements such as key dialogues 467, themes 468 and events 469. These narrative elements are post-processed 470 by refinement 471 and interpretation 472.

The output of the NLP inference model is a set of timestamps, each associated with metadata that includes classifications and annotations related to the narrative essence. This metadata may include, e.g., key phrases and plot points, character interactions and significant portions of dialogue, and/or thematic elements and emotional tones identified from the CCs.

In some embodiments, video content can be analyzed in view of user-related considerations. However, in many embodiments it is preferable to do the video content analysis independently from user preferences, e.g., to establish an independent narrative that can be further processed based on user preferences, e.g., in the segmentation/stitching phase.

Performing a large part of the video content analysis independently of user preferences can provide a base product (e.g., a selection of portions of the video content) in a less processing-intensive manner. These previously selected materials may then be analyzed based on user preferences to create individually tailored micro-binge clips in a more efficient manner.

In various embodiments, textual summaries can be provided in various ways using generative NLP techniques. In some embodiments, a summary can be provided for segments included in a clip. In some embodiments, a summary can be provided for portions of the video content item that were excluded from the clip. In this example, the user can be informed regarding other narrative features included in the video content that are not shown in the clip.

The image recognition can use any number of frames as input. In some examples, to reduce the processing burden without sacrificing much performance, frames can be extracted from a video file at regular intervals and only these extracted frames can be analyzed for visual content, e.g., one frame per second.

In some embodiments, the image recognition comprises a neural network-based ML model/architecture. In one aspect, the image recognition model comprises a CNN. A CNN can effectively analyze and classify visual data and can be employed to detect and recognize key visual elements in the video frames, such as characters, objects and significant scenes.

In another aspect, the image recognition model comprises a supervised learning model with labeled datasets. This approach ensures that the models learn to accurately identify and classify various visual elements based on pre-defined labels.

In some embodiments, various image recognition techniques can be used including object detection, recognition or classification; facial detection, recognition, and/or classification; emotion recognition and/or classification; scene classification; and/or event detection.

In one aspect, object detection algorithms can be used to identify and classify objects within video frames. The object detection can identify important props, settings, and other objects that contribute to the narrative, e.g., objects like "spaceship," "alien," and "laser gun" in a frame from Star Trek.

In another aspect, facial recognition algorithms can be used to detect and recognize characters present in a video frame, e.g., identifying the face of a character. In another aspect, emotion recognition can detect and classify emotions expressed by characters' faces, e.g., recognizing emotions like "fear." The facial/emotion recognition can identify insights into character interactions and emotional tones, which are crucial for understanding the narrative flow.

In another aspect, scene classification algorithms can be applied to categorize different types of scenes, such as action sequences, dialogue scenes, and transitional moments. The scene classification can identify the context and significance of each scene within the narrative. For example, a scene can be classified as a "battle scene" due to the presence of soldiers, weapons, and explosions.

In another aspect, event detection algorithms can be used to identify significant events in the video, such as plot twists, climactic moments, and key actions. The event detection can ensure that the most impactful and engaging parts of the narrative were captured. Detecting action can be particularly useful, e.g., recognizing the action of "running" in a chase scene.

The corpus includes labeled video frames with annotations for significant visual elements, such as character expressions and key scenes. Pre-processing involves resizing images and normalization.

In some embodiments, pre-trained models can be used for initial object detection and facial recognition tasks. These models can provide a basis that can be fine-tuned using domain-specific video data to improve their accuracy in identifying narrative-relevant visual elements. In some embodiments, the image recognition model is trained with CNNs for image recognition. The output is a trained image recognition model capable of detecting significant visual elements In some embodiments, pre-trained CNN models from ImageAI can be fine-tuned using a dataset of annotated video frames. This involved transfer learning techniques, where the final layers of the model were retrained to recognize specific visual elements relevant to narrative content.

Figure 5A:
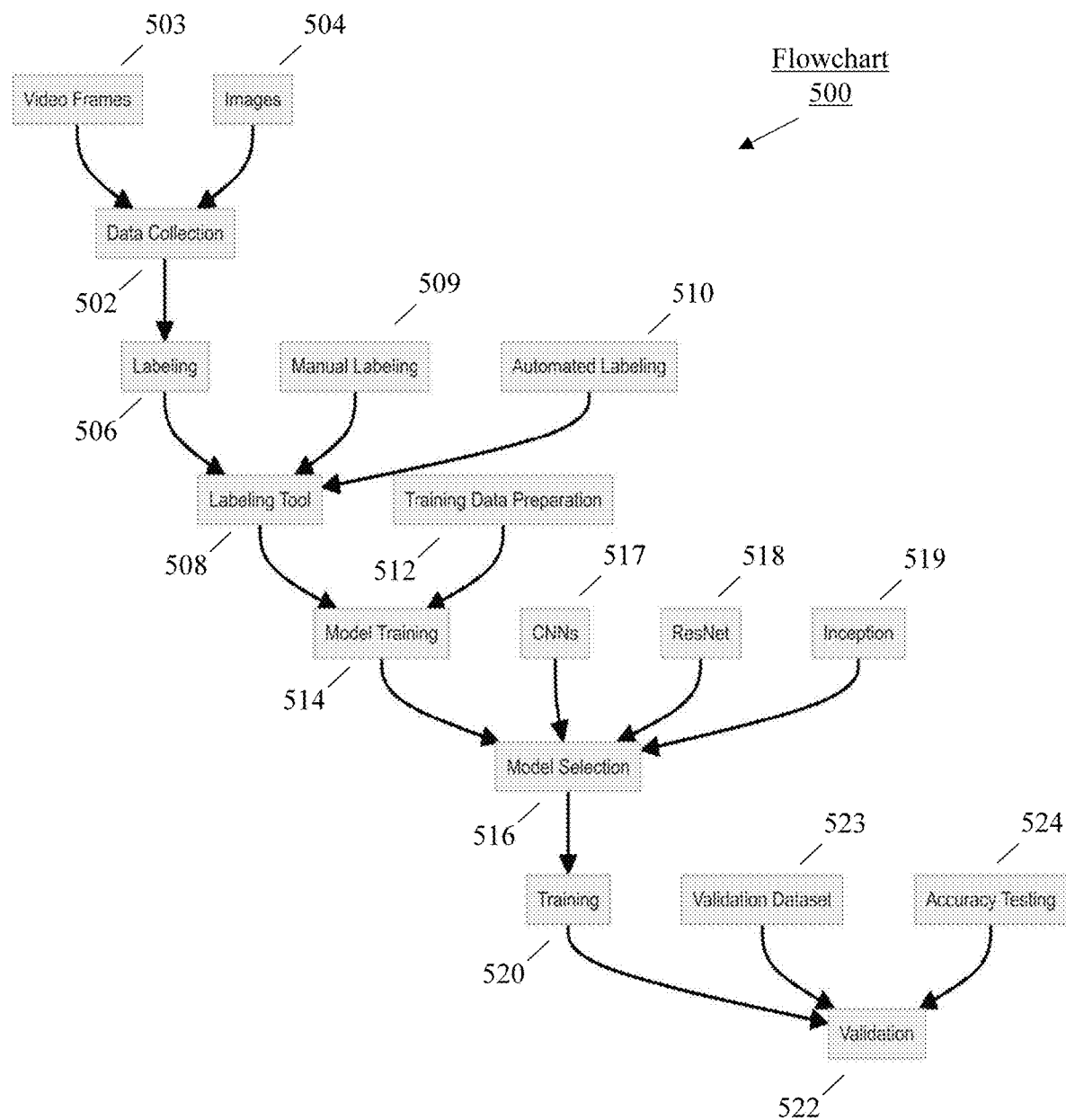
FIG. 5a shows a flowchart for training an image recognition model for narrative analysis according to various exemplary embodiments.

FIG. 5a shows a flowchart 500 for training an image recognition model for narrative analysis according to various exemplary embodiments. In 502, data is collected include video frames 503 and/or images 504. In 506, the data is labeled by a labeling tool 508. The labeling tool 508 can be manual 509 or automated 510.

A training dataset 512 is prepared from the labeled data and, in 514, a model training phase is initiated. In 516, a model is selected from options including CNNs 517, ResNet 518 and Inception 519. In 520, the selected model is trained with the training dataset. In 522, the model is validated by a validation dataset 523 and/or accuracy testing 524. The validation dataset 523 can include a type of video content different from that of the video frames 503 and/or images 504 used to train the model.

In the inference phase, incoming video frames are pre-processed for size and normalization. The primary input to the image recognition inference model is the pre-processed video file comprising the pre-processed video frames of the video content item. This includes individual frames extracted from the video. In some embodiments, the model may also utilize associated metadata from the video to enhance recognition accuracy.

The output of the inference model is the identification of significant visual elements which are used to mark timestamps of key scenes. The output can comprise a set of timestamps with metadata corresponding to the timestamps, including classifications and annotations related to the visual narrative essence. This metadata may include detected objects and their classifications; recognized faces and classified emotions; identified scenes and their context; and/or significant events and actions.

Figure 5B:
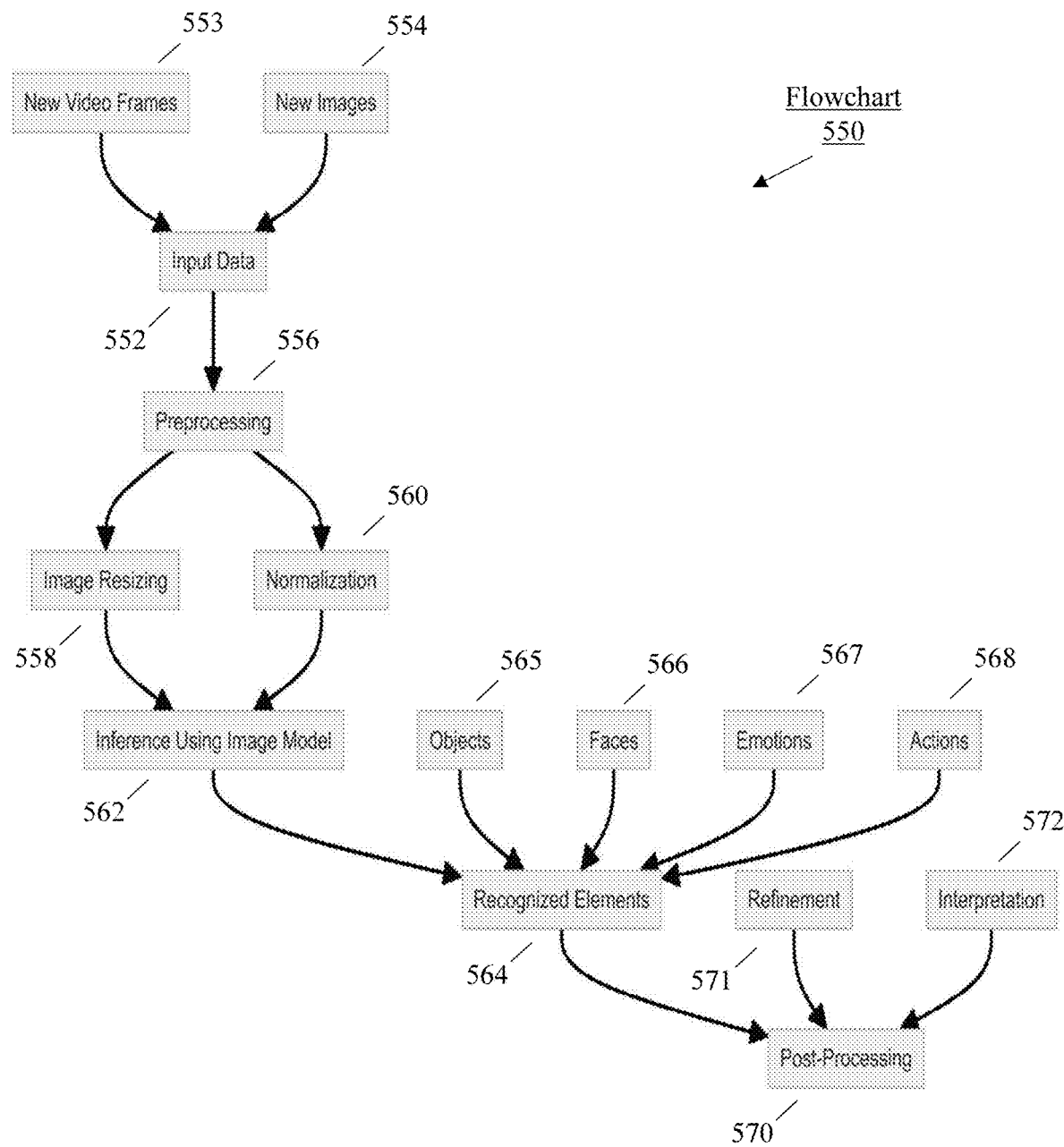
FIG. 5b shows a flowchart for applying a trained and validated image recognition model according to various exemplary embodiments.

FIG. 5b shows a flowchart 550 for applying a trained and validated image recognition model according to various exemplary embodiments. In 552, input data is received for a video content item, the input data comprising video frames 553 and/or images 554. In 556, the input data is preprocessed by image resizing 558 and normalization 560.

In 562, the image recognition model is executed with the preprocessed data as input. The inference model extracts image/video elements such as objects 565, faces 566, emotions 567 and actions 568. These image/video elements are post-processed 570 by refinement 571 and interpretation 572.

In some embodiments, every frame of the video content item can be analyzed by image recognition so that the granularity of the time stamp generation is on frame level. This can be beneficial to maximize the quality of the video clip generation, e.g., to ensure that the segments and clips are generated precisely for maximum user satisfaction. In other embodiments, a subset of the frames of the video content item can be analyzed by image recognition and the granularity of the timestamp generation may be on a higher level such as, e.g., milliseconds, tens of milliseconds, hundreds of milliseconds, or seconds. For example, to conserve computing power and associated costs, a streaming service may provide the micro-binging functionality with a content analysis and segmentation precision that is relatively low, such that segments included in a clip start and end at roughly the correct time to preserve the narrative essence, although this has the potential to result in the missing of small details at the start or end of the segment.

As described above, some initial narrative analysis can be performed based solely on image recognition including identifying key objects, character appearances, emotions, and significant scenes. In some embodiments, a comprehensive narrative analysis can be performed after combining the image recognition output with the NLP output. This harmonized approach ensures a more complete understanding of the narrative by integrating both visual and textual elements.

The harmonizing of the NLP and image recognition can include an alignment of narrative elements. A temporal alignment can ensure that the identified dialogues, themes, and events are aligned in the correct chronological order. The logical flow or narrative coherence of the story can be maintained by ensuring that the transitions between scenes are smooth and make sense within the context of the overall narrative. For example, the dialogue "I'm leaving" can be aligned with the visual scene where a character is seen packing a suitcase and leaving a house. In another example, the dialogue "We need to escape" with a visual of characters discovering a secret passage.

The harmonization can further include prioritization based on narrative importance and/or user preferences. Scenes and moments can be prioritized based on their importance to the narrative. Key plot developments, emotional climaxes, and crucial character interactions can be given precedence, e.g., prioritizing a critical confrontation scene over a minor side conversation to ensure the main plot remains central.

User preferences can be incorporated to tailor the narrative flow to individual interests, such as prioritizing action scenes for users who prefer high-energy content. During scene selection, scenes and dialogues can be identified in a priority order. Depending on the duration constraint for the generation of the clip, scenes can be selected based on priority, e.g., for shorter clips, only the highest priority scenes are selected.

In some embodiments, a unified narrative map can be created that integrates both textual and visual data, outlining the main plot points in a coherent sequence. During clip generation, the narrative map can be used to ensure coherence and continuity in the storyline, maintaining logical progression and smooth transitions, e.g., arranging scenes to maintain a logical progression from a mysterious event to it its resolution.

Figure 6:
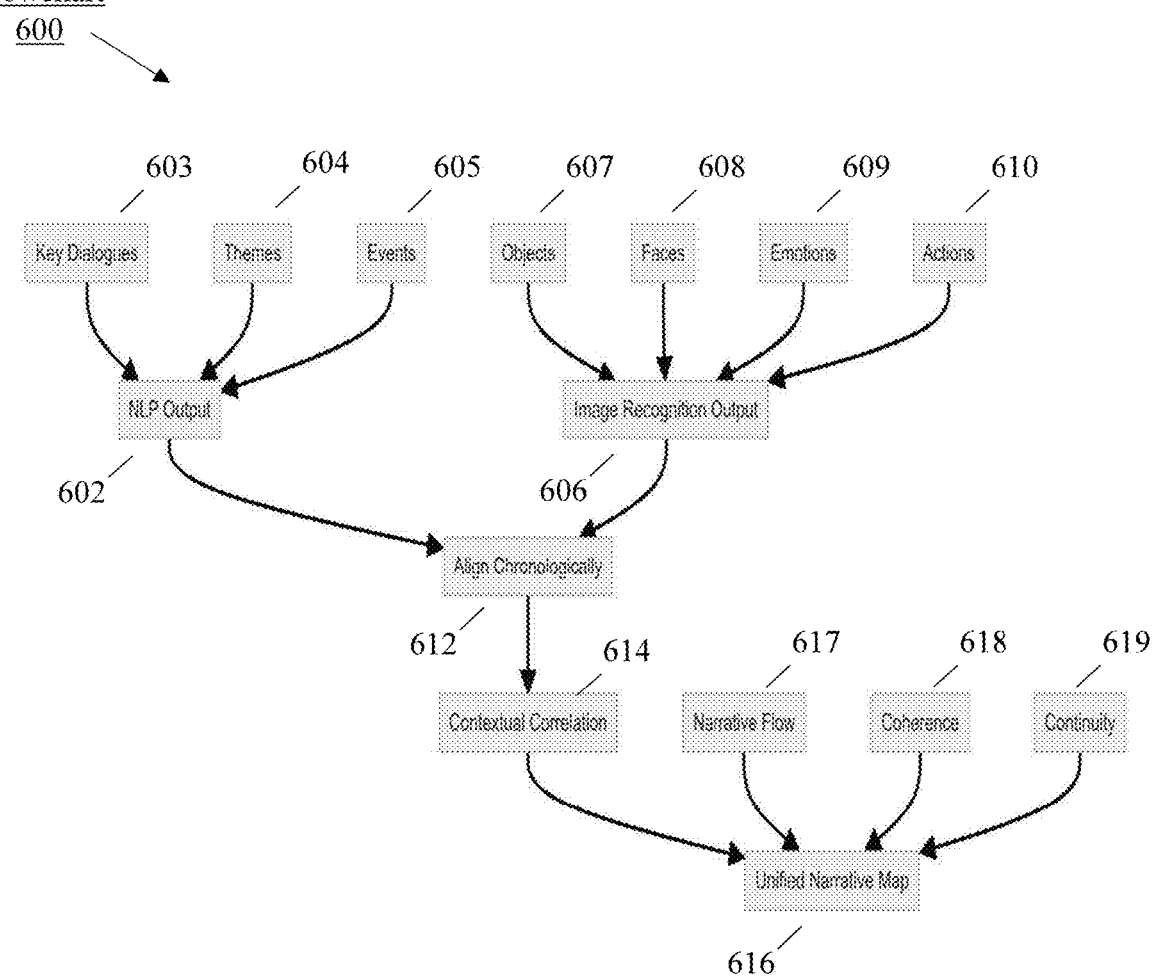
FIG. 6 shows a flowchart for harmonizing the output of the NLP model and the image recognition model according to various exemplary embodiments.

FIG. 6 shows a flowchart 600 for harmonizing the output of the NLP model and the image recognition model according to various exemplary embodiments. In 602, the NLP output includes key dialogues 603, themes 604 and events 605. In 606, the image recognition output includes objects 607, faces 608, emotions 609 and actions 610.

In 612, the NLP output and the image recognition output are aligned chronologically. In 614, context is correlated. In 616, a unified narrative map is generated including narrative flow 617, coherence 618 and continuity 619.

In some embodiments, the content analysis can include a hybrid model.

Figure 7A:
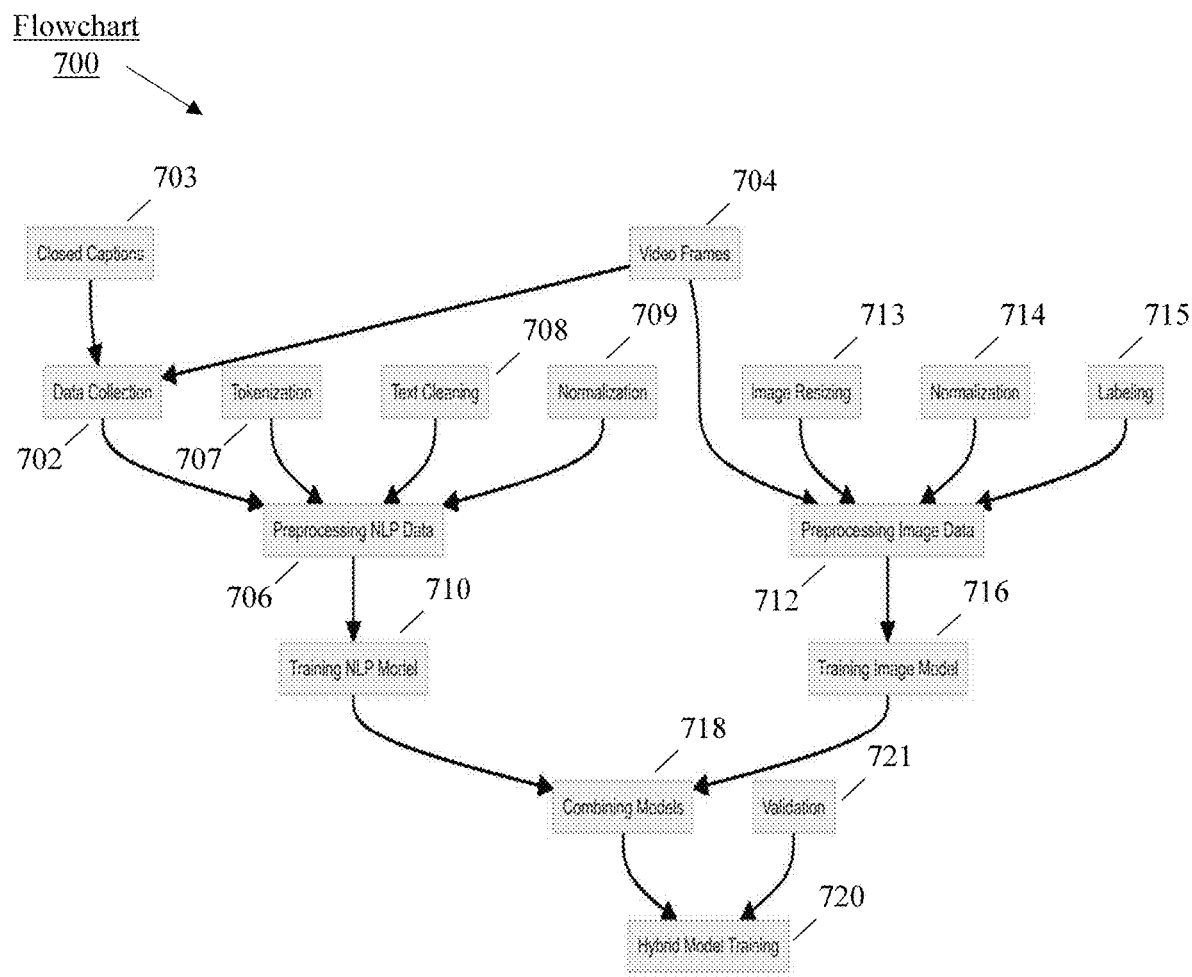
FIG. 7a shows a flowchart for training a hybrid model for NLP and image recognition according to various exemplary embodiments.

FIG. 7a shows a flowchart 700 for training a hybrid model for NLP and image recognition according to various exemplary embodiments. In 702, data is collected for training the hybrid model, the data including closed captions 703 and video frames 704 for one or more video content items. In 706, data is preprocessed for training the NLP model, the preprocessing includes tokenization 707, text cleaning 708 and normalization 709. In 710, the NLP aspect of the model is trained.

In 712, data is preprocessed for training the image recognition model, the preprocessing includes image resizing 713, normalization 714 and labeling 715. In 716, the image recognition aspect of the model is trained. In 718, the NLP aspect and the image recognition aspect are combined. In 720, the hybrid model is trained 720 and validated 721.

Figure 7B:
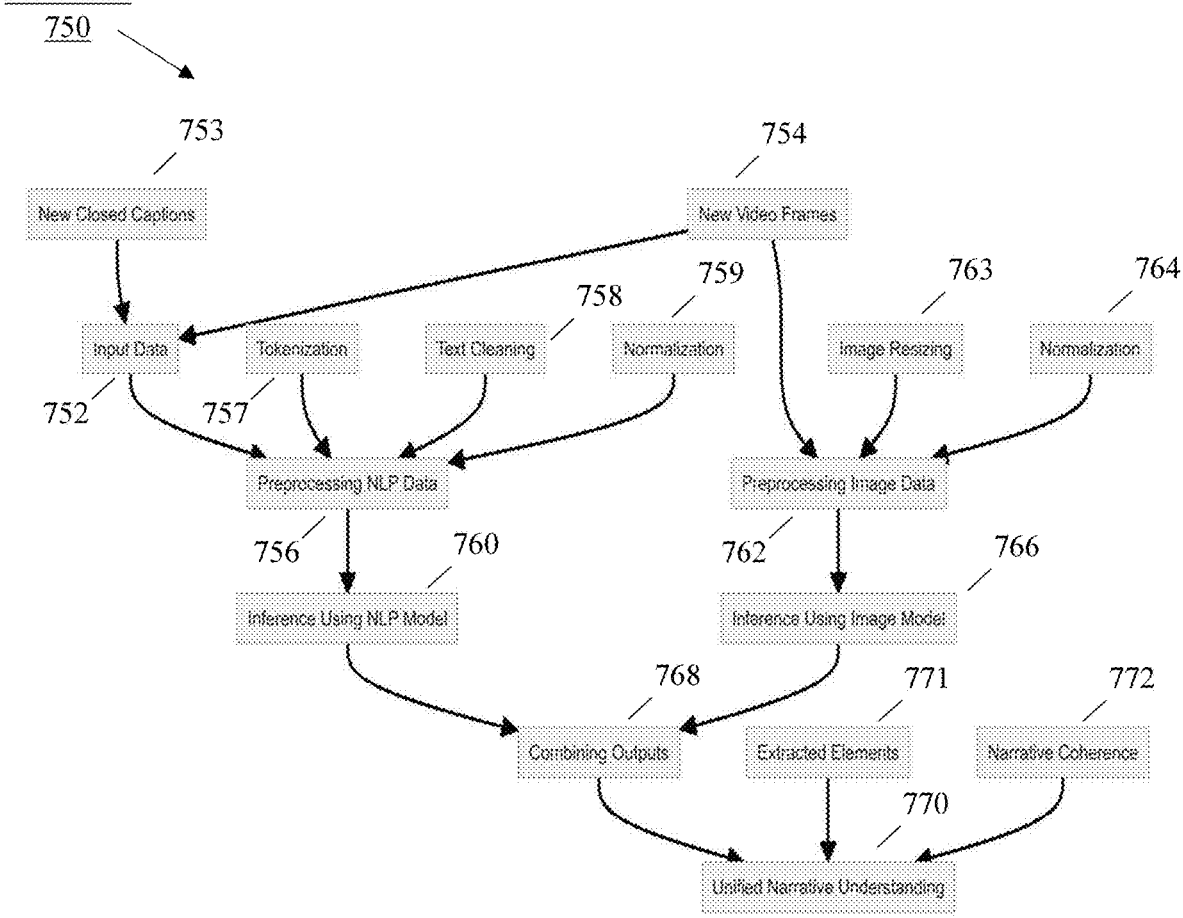
FIG. 7b shows a flowchart for applying a trained and validated hybrid model for NLP and image recognition according to various exemplary embodiments.

FIG. 7b shows a flowchart 750 for applying a trained and validated hybrid model for NLP and image recognition according to various exemplary embodiments. In 752, new data is collected for analysis by the trained and validated hybrid model, the new data including closed captions 753 and video frames 754 for a video content item to be analyzed. In 756, the data is preprocessed for inference by the NLP aspect of the hybrid model, the preprocessing including tokenization 757, text cleaning 758 and normalization 759. In 760, the NLP aspect of the model is executed for inference.

In 762, the video frame data is preprocessed for inference by the image recognition aspect of the hybrid model, the preprocessing includes image resizing 763 and normalization 764. In 766, the image recognition aspect of the model is executed for inference. In 768, the NLP output and the image recognition output are combined. In 770, a unified narrative understanding is generated.

In some cases, the segmentation and the stitching are decoupled. In other cases, the segmentation and the stitching are performed in coordination.

Training data for a segmentation/stitching model includes the annotated timestamps from the NLP and image recognition analyses. Pre-processing involves aligning timestamps with narrative flow. Rules-based algorithms can be used to generate initial clips, followed by user feedback to refine the process. The output of the training comprises a trained model for selecting and stitching video segments into coherent clips.

In the inference phase, new timestamps are aligned with narrative flow. The input comprises timestamps of significant moments. The output comprises short, coherent video clips tailored to user-defined viewing windows.

As described above, video segmentation generally refers to the identification of durations within a video content item, each duration being defined by a starting timestamp and an ending timestamp. A segment may generally comprise any duration. In some embodiments, it may be preferable to define a minimum segment size. The minimum segment size may vary depending on a variety of considerations including, e.g., user preferences.

In some embodiments, the video segmentation can be performed based on a maximum duration for a video clip. This maximum duration may be a time window that is available for selection by a user. In other embodiments, this may be run automatically for a number of different durations (e.g., 5 min, 10 min, etc.).

In many embodiments, some type of narrative analysis is performed in the segmentation phase. Most of the narrative analysis is done during the content analysis step, where key elements, plot points, and significant scenes are identified using NLP and image recognition. However, in many cases, the segmentation and stitching process necessarily involves some additional narrative analysis. There must be a prioritization of certain narrative moments over others to ensure that the condensed clip remains coherent and engaging while remaining within a specified maximum duration.

If a movie has 30 pivotal scenes, each 1 minute long, the 30-minute micro-binge could include all scenes in full. For a 10-minute micro-binge, the model must prioritize and condense the content. It must decide whether to reduce each pivotal scene to 20 seconds, to cut some scenes completely, or adapt each pivotal scene in different ways.

The prioritization of video content for a user at the segmentation phase and/or at the stitching phase can be executed in a number of ways. In one example, it may be prioritized for the entirety of a certain scene to be included in a clip. In another example, only a small portion of a certain scene is prioritized for inclusion in the clip.

In some embodiments, a support vector machine (SVM) or a decision tree can be used to classify scenes and prioritize narrative moments.

In some embodiments, the content segmentation phase, the clip stitching phase, and clip delivery phase are performed in sequence, e.g., on the fly, upon user request. In these embodiments, the narrative analysis can provide a comprehensive understanding of the narrative flow of the video content item in advance of the clip generation. A clip may be requested by a user with one or more constraints included, e.g., a maximum duration of the clip, and the remaining steps can be performed in dependence thereon. For example, if a window of 5 minutes is requested by the user, a partial narrative analysis is performed to identify 5 minutes worth of content that should be included in the clip.

This partial narrative analysis can function in various ways according to various considerations that balance narrative cohesiveness and user enjoyment. For example, a 5 minute clip of a two hour film is clearly limited in breadth and cannot possibly capture narrative nuances throughout the film. Thus, cuts will have to be made to important moments throughout the film. In some examples, a large number of short segments of a large number of scenes (potentially multiple segments within the same scene) may be generated to give a quick snapshot of the arc of the movie. In other example, a short number of longer segments capturing fewer numbers of scenes may be generated to give fuller context for the most important moments in the film. In another example, a 90 minute clip of a two hour film can, in some cases, approximate an entire narrative arc of the film, e.g., by cutting only superfluous or less important scenes. Accordingly, it can be seen that the makeup of the clip can vary significantly according to the preferences of a distributor.

The model uses a set of prioritization rules to determine which scenes are most critical to the narrative flow. These rules might consider factors such as: Importance of the scene to the overall plot, emotional impact and character development, continuity and coherence within the condensed clip. In one example, high priority scenes can comprise scenes with significant plot developments, emotional climaxes, character arcs and thematic highlights; medium priority scenes can comprise supporting scenes that provide context but are not essential, e.g., character interactions or establishing shots depicting a setting in which the action takes place; low priority scenes can comprise minor scenes that can be cut without significantly impacting the narrative.

Moments with high emotional impact can prioritized to ensure the clip captures the essence of the emotional journey of the narrative, e.g., emotional climaxes, such as a tearful goodbye or a joyous reunion, can be included to engage viewers. Scenes that significantly contribute to character development and relationships can be prioritized, e.g., key interactions that reveal character motivations or relationships, such as a pivotal conversation between protagonists.

User preferences can be incorporated into the prioritization process for selecting segments to include in the clip. For example, favorite characters or preferred themes can be considered. In another example, if a user prefers action scenes, the system can prioritize high-energy moments over slower, dialogue-driven scenes.

The segments are selected to ensure that the selected moments form a coherent and continuous narrative when stitched together. A logical sequence of events can be maintained to avoid disjointed storytelling, ensuring smooth transitions between scenes.

For shorter time windows, the model condenses scenes by either reducing their duration or cutting them entirely. High-priority scenes might be reduced to highlight only the most critical moments. Low-priority scenes might be excluded to fit the time constraint. Returning to the example above, for the 10 minute micro-binge, the segmentation model can capture only the top 10 scenes in full or condenses 15 scenes to 20 seconds each, depending on narrative importance.

The prioritization rules can be established during a training process for the segmentation/stitching model. The final output is a stitched clip that maintains narrative coherence and captures the essence of the original content within the user's specified time window.

In many cases, the clip will be generated in dependence on the segmentation. For example, the segments making up a clip of the desired duration are provided directly to the clip generation module. In other cases, the segmentation is performed in advance and the clip is generated by selecting and stitching a number of video segments.

In many cases, a clip may be generated by stitching multiple video segments together. In some cases, a clip may be generated from a single video segment. In some embodiments, the video clip can be generated independently of any user preferences and/or inputs, yet may be retrieved in view of one or more user preferences and/or inputs.

In some embodiments, respective segments from multiple different video content items can be stitched into a single micro-binge clip. In one illustrative example, a content analysis can be performed for an entire season of a show or for multiple seasons of a show. A user desiring to watch a condensed version of the show across multiple episodes can be provided a video clip spanning multiple episodes. The content analysis can encompass continuations of storylines across seasons.

In some embodiments, a video clip can be generated and delivered to a user of a streaming service on demand.

Figure 8:
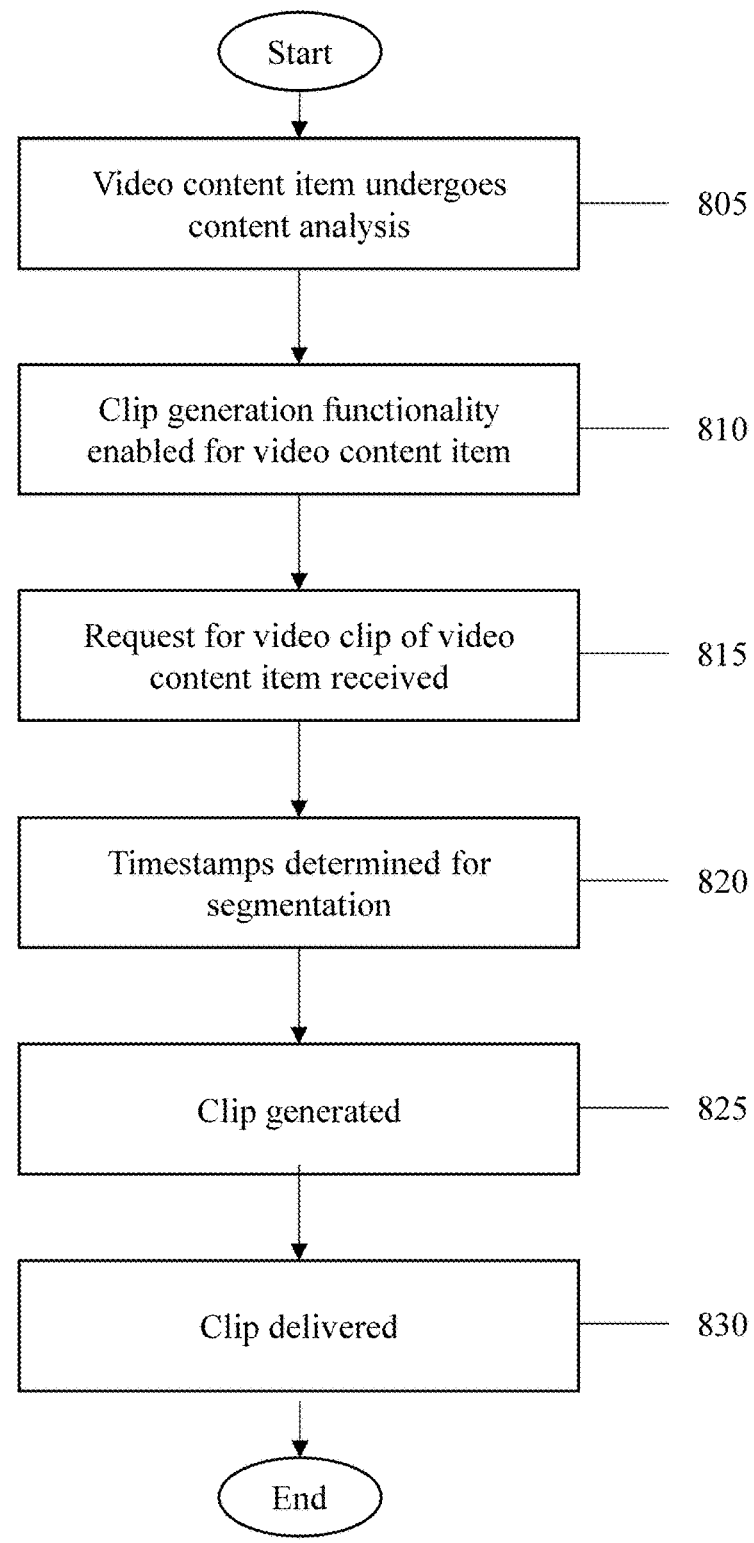
FIG. 8 shows a flowchart for on-demand video clip generation and delivery according to one example of these exemplary embodiments.

FIG. 8 shows a flowchart 800 for on-demand video clip generation and delivery according to one example of these exemplary embodiments. The flowchart 800 is described from the perspective of a streaming platform. The streaming platform includes a library of video content and provides a consumer-facing user interface by which a user can select a video content item for streaming.

In 805, a video content item undergoes content analysis. In this example, the content analysis includes the NLP, image recognition, and harmonization of the outputs, as described above. Accordingly, the narrative arc of the video content item is defined with associated timestamps. In this example, the content analysis is performed in advance of making the video content item available to a user for on-demand clip delivery, while the clip generation is performed upon user request.

In 810, a clip generation functionality for the video content item is enabled for a user of the streaming platform. In one embodiment, after the content analysis of 805, the user interface provided by the streaming platform is modified so that, in addition to providing an option for selecting the video content item to stream in full, a further option is provided for selecting to generate a clip of the video content item. This clip generation functionality may be referred to as a "Micro-binge" functionality.

In this example, the user can specify their available viewing time, such as 5 minutes, 10 minutes, 15 minutes, etc. This input determines the length of the micro-binge session.

In 815, a request for on-demand video clip delivery of the video content item is received. The request identifies the video content item and includes the requested time window.

In some embodiments, the available viewing time is the only user input that is considered in the clip generation process and the clip generation is agnostic to user preferences or user inputs other than the time window. In other words, the narrative elements to be captured in the clip are not personalized for the user. In other embodiments, to be described in greater detail below, the clip generation can consider additional user inputs and/or preferences.

In 820, timestamps are determined for segmentation and clip generation. In this example, a partial narrative analysis is performed in view of the time constraints specified by the user so that the most important or most engaging part of the narrative In this example, the segmentation and the clip generation are performed in coordination. In other embodiments, the segmentation may be done in advance such that determining the timestamps for clip generation comprises the selection of a number of segments to stitch together.

In 825, the clip is generated by segmenting the video content item such that the combined duration of the segments is within the user-specified viewing window.

In 830, the clip is delivered to the user for streaming.

In these embodiments, video clips are generally not stored by the streaming platform. They can instead be viewed by a user and then discarded. In some embodiments, the video clip can be saved temporarily, e.g., in case the user pauses the video clip before finishing streaming, so that the user can revisit the video clip.

As described above, the content analysis comprises the most computationally intensive portion of the clip generation process. For a streaming service hosting a content item and providing the clip generation (micro-binge) functionality, it is preferable to perform content analysis before the content is available for streaming. This pre-processing ensures that the narrative arc and key elements are well-established, e.g., that all narrative elements are pre-identified, allowing for smoother on-demand clip generation. By performing content analysis beforehand, the streaming service can allocate resources more effectively, ensuring that the most intensive computational tasks do not interfere with user experience during streaming.

Additionally, the content analysis can be re-used to generate multiple different clips having different constraints, e.g., different time windows and/or different priorities in view of user preferences. Accordingly, the content analysis is preferably performed well in advance of the clip generation. It should be understood that in other embodiments the content analysis can also be performed on-demand, if desired.

In some embodiments, the content analysis is stored by the streaming service in association with the video content item so that the content analysis is available for segmentation and clip generation upon user request.

In some embodiments, as described above with regard to FIG. 8, the content segmentation phase, the clip stitching phase, and clip delivery phase are performed in sequence, e.g., on the fly, upon user request. In these embodiments, the narrative analysis can provide a comprehensive understanding of the narrative flow of the video content item in advance. A clip may be requested by a user with one or more constraints included, e.g., a maximum duration of the clip, and the remaining steps can be performed in dependence thereon. For example, if a window of 5 minutes is requested by the user, a partial narrative analysis is performed to determine five minutes worth of content that should be included in the clip.

In some embodiments, the content segmentation phase can be performed in advance of the clip stitching phase. In other words, a series of segments can be defined for the video content item, each segment having a defined start time and a defined end time and being associated with metadata relating to the narrative context of the segment. In this case, the clip stitching phase merely comprises the selection of a number of segments to include in the clip and the combining of these segments into the clip. This option may be considered to speed up the clip delivery upon user request.

An alternative embodiment involves generating clips immediately after the content analysis and before analyzing (or even gathering) user inputs. This approach can be useful for popular content items, where demand for micro-binge sessions is anticipated.

In some embodiments, the content segmentation phase and the clip stitching phase can be performed in sequence and prior to the clip delivery phase. In these embodiments, the clips are generated independently of any user input. In one example, for a given video content item, a number of clips can be pre-generated having different lengths and/or different types of content. In one example, clips can be generated having successively longer time durations, e.g., 5 minutes, 10 minutes, 15 minutes, in predefined intervals. The user can request one of these clips based on user preferences regarding a time window. This option may be considered to further speed up the clip delivery upon user request. In addition, as would be understood by those skilled in the art, user preferences may also define the type of clip that is to be generated.

This can facilitate the recommendation functionality, in which pre-generated clips can be stored and matched to users based on their preferences and profiles when they request to watch. This method reduces the need for real-time processing, offering a quick response time for user requests.

In another embodiment, a hybrid approach can be used where initial clips are pre-generated, but further refinement and customization are performed on the fly based on user-specific inputs. This ensures both quick availability and personalized tailoring. This approach can be scaled based on the popularity of content items, with more resources allocated to frequently accessed items to maintain performance and user satisfaction.

In some embodiments, the content analysis can be done for all or part of a library of video content, e.g., all or part of the video content provided by a streaming service. It should be understood that the present embodiments should be implemented for copyrighted video content only with the permission of the content owner. A particular content item should be excluded from the content analysis if permission is not provided by the copyright owner for enabling micro-binging for the particular content item.

The content analysis can include the steps up to and including the harmonization of the outputs of the NLP and image recognition for each analyzed video content item. These content analyses can be stored in association with the video content item such that certain narrative features can be searched across the respective content analyses of many different films or shows. The content analysis being performed for multiple content items in advance can help to enable on-demand clip generation that considers user preferences/inputs such as preferred genre, etc., to be described below. This can also help to enable the content recommendation functionality, to be described below.

In some embodiments, it may be beneficial to also logically segment the multiple video content items that have been pre-analyzed. This logical segmentation can define aspects of the narrative in a manner crafted to enable quick clip generation at a later time, e.g., upon user request.

User preferences can be integrated into the clip generation process in various ways.

With regard to the on-demand clip generation described in FIG. 8, in some embodiments, the only user preference considered is a maximum time duration for the video clip of a selected video content item. In other embodiments, a user can indicate preferences for clip generation that can constrain the clip generation process, e.g., by using different priority rules for determining the segments to include in the video clip. In still other embodiments, a user profile can be generated indicating user preferences based on an analysis of user data, e.g., historical viewing data.

The use of additional user inputs and/or a user profile is relatively limited in the embodiments where a user manually selects the video content item to be condensed into a video clip. For example, genre preferences have limited use when the user has already selected a movie within a particular genre. However, in embodiments where a recommendation functionality is used to select video content to recommend to a user, additional user inputs and/or a user profile can be very useful.

Additional user inputs can include user preferences such as preferred genre. Users can specify their preferred genres, such as drama, comedy, action, etc. This information can enable content recommendations tailored to align with the interests of the user. Additional preferences may include favorite actors, preferred languages, or specific themes (e.g., sci-fi, romance). These inputs help further customize the content delivery to suit individual tastes. It should be understood that the user preferences can be limited to pre-defined options provided by the streaming service or the system may be capable of handling more complex user preferences, e.g., by implementing an additional NLP model for analyzing user inputs.

A user profile can be developed based on a combination of user preferences, historical viewing data, and other considerations. Historical viewing data can be analyzed to identify patterns and preferences. In some embodiments, ML techniques are used to generate and refine a user profile.

The ML techniques for generating a user profile can include clustering and collaborative filtering for analyzing user data and identifying patterns. The user data can include historical viewing data, user preferences (genres, time constraints), user feedback, or other data. The user data is pre-processed with data cleaning and normalization prior to employing the ML techniques.

Additionally, the system can track and analyze users past viewing behaviors, including the types of content they watch frequently (genre, etc.), their favorite shows, and their viewing patterns (e.g., preferred viewing time). This data can be used to refine recommendations and personalize the viewing experience. The system continuously updates and refines the user profile based on new viewing data and interactions. This ongoing refinement ensures that recommendations remain relevant and personalized.

A user profile can be generated and dynamically updated over time. Some aspects of the user profile can be generated based on direct input from the user. For example, during account creation, users can be prompted to input their genre preferences, favorite shows or movies, and preferred viewing durations. In another example, users can be asked to fill out surveys or questionnaires to refine their preferences and provide feedback on their viewing experience, e.g., periodically. In still another example, users can interact with content through likes, dislikes, ratings, and comments, which are collected and analyzed to update their preferences.

In one illustrative example, a new user signs up to a streaming service (e.g., Paramount+) and is guided through a setup wizard. The user selects their favorite genres (e.g., Action, Comedy, Drama) and indicates preferred shows (e.g., "Star Trek: Picard," "The Good Fight") and typical viewing durations (e.g., 30 minutes, full movies). After watching the first season of a show, e.g., "Yellowstone," the user is prompted with a survey asking specific questions about their enjoyment of the series, preferred characters, and elements they would like more or less of in the future. While browsing, the user likes several clips from a first show, e.g., "NCIS" and rates episodes of a second show, e.g., "Criminal Minds." These interactions are recorded to fine-tune the recommendation engine to suggest similar crime dramas or shows featuring the liked characters.

Even if a particular user is not inclined to provide such direct feedback, some aspects of the user profile can be generated by collecting data on the user. For example, the system can track users' viewing history, including the types of content watched, the frequency of views, and the completion rate of episodes or movies. In another example, the system can monitor user behavior, such as pause, rewind, and fast-forward actions, to infer preferences and engagement levels.

User profiles can be continuously updated based on new interactions and feedback. This dynamic updating ensures that recommendations remain relevant. Different preferences can be weighed based on their recency and frequency. For example, recent likes or highly rated genres may be weighted higher to influence a current recommendation.

With regard to historical viewing data, the system can analyze viewing patterns to identify preferred genres, themes, and viewing times. Frequent rewatching of certain genres or specific shows indicates strong preferences. Additionally, metrics such as watch time, episode completion rates, and binge-watching sessions can be used to gauge user interest and satisfaction with different content types. In one illustrative example, a historical viewing analysis can reveal a pattern, e.g., a user often selects horror films during October, prompting a seasonal adjustment in content recommendations. In another illustrative example, an analysis of engagement metrics can reveal that the user's session duration increases when watching historical dramas, which is used to gauge a deeper interest in this genre.

With regard to genre preferences, the system can cross-reference user-stated genre preferences with historical viewing data to refine and verify the user's tastes. Each piece of content can be tagged with multiple genres and sub-genres and the recommendation engine can match these tags with user preferences to suggest suitable content. The content can also be tagged by mood and pace, e.g., "fast-paced," "dark comedy"), helping to refine the alignment between user preferences and content offerings. In one illustrative example, a user can indicate a preference for thrillers. The system cross-references this with historical data showing high ratings for thrillers with strong female leads, refining future content suggestions With regard to user feedback, immediate feedback, such as likes, dislikes, and ratings, can be used in real-time to adjust recommendations dynamically. A dislike for a particular show may reduce the likelihood of similar content being recommended. Additionally, a sentiment analysis can be performed on feedback comments to understand user emotions and satisfaction levels, further refining content suggestions.

In one illustrative example, the system determines that the user frequently watches science fiction late at night and completes most episodes of a science fiction series, e.g., "Star Trek: Discovery," indicating a strong preference for this genre and viewing time. During a suspenseful episode of a series, e.g., "The Twilight Zone," the user uses the reaction button to express excitement at key moments. This feedback is immediately noted to enhance content curation that matches the thrill and suspense elements. Observations show the user often rewinds action scenes in movies, e.g., "Mission: Impossible" movies, suggesting a preference for high-energy content. The system adjusts to highlight more visually dynamic scenes in recommendations. In another illustrative example, comments left by the user on the finale of a show can be analyzed for sentiment, revealing dissatisfaction with the ending. This insight can be used to recommend alternative series with higher-rated finales In another illustrative example, based on recent interactions, such as increased interest in documentaries, e.g., "60 Minutes," the user's profile is dynamically updated to start including more educational content. Recent binge-watching of a comedy is weighted more heavily, subtly shifting upcoming recommendations to include more humorous content, reflecting the user's evolving preferences.

In some embodiments, a user can request certain types of content to be prioritized in clip generation. For example, a user may indicate that the clip should not contain spoilers (should not give away surprises within the narrative), or that the clip should include information only from a desired portion of the content (e.g., just the first half of the content), or the user may specify that the clip should focus on one or more selected characters or on a specific story line, etc.

The content recommendation process can integrate user preferences to generate personalized micro-binge clips, ensuring an engaging and tailored viewing experience. In the AI-Powered Micro-Binge Watching feature, content recommendation involves automated selection of content that matches user preferences, without requiring manual selection by the user. This process leverages detailed narrative-related metadata stored in a searchable format. AI/ML techniques such as collaborative filtering, content-based filtering, hybrid systems, deep learning, and reinforcement learning are used to generate personalized recommendations. By integrating these techniques, the system ensures efficient and relevant content delivery, enhancing user satisfaction and engagement.

In these embodiments, the user does not manually select a content item. Instead, the system automatically selects content that matches the user's preferences. As described above, the streaming service can host a library of video content in which individual content items are pre-analyzed by NLP and image-based content analysis. The content items can be classified in various ways, e.g., according to thematic elements, key plot points, character interactions, and/or emotional tones, as described above. The video content items may additionally be segmented in advance and/or clips of the video content items may be generated in advance. The narrative-related metadata, e.g., narrative classifiers for each content item and/or its segments/clips, can be stored in a searchable format so that the system can locate and match relevant content items and clips to a user profile based on their preferences and viewing history.

A recommendation model can implement ML techniques including collaborative filtering, matrix factorization, and reinforcement learning to train the recommendation algorithm. The training can be based on user profiles, historical viewing data, and content metadata. Pre-processing involves feature extraction and normalization. The trained recommendation model is capable of suggesting relevant micro-binge clips.

Recommendations can be generated using the recommendation model. User preferences, such as available viewing time, genre, and historical viewing data, are integrated into the recommendation algorithm. The algorithm uses this information to curate a personalized list of micro-binge clips that align with the user's interests and available time.

The recommendation algorithm employs machine learning techniques to analyze user data and predict which content segments will be most appealing to the user. It considers factors like content freshness, user feedback, and genre diversity to ensure a varied and engaging selection.

In some embodiments, collaborative filtering is used. Collaborative filtering involves making recommendations based on the preferences and viewing habits of similar users. It identifies patterns in user behavior, e.g., among users in a group, to suggest content that other users with similar tastes have enjoyed. This technique can be used to recommend micro-binge clips that align with the preferences of users who have similar viewing histories. As new data is collected, the collaborative filtering model updates its recommendations to reflect current trends and user behaviors. In one illustrative example, a user frequently watches sci-fi series with strong character development. The system identifies other users with similar patterns and suggests a newly added series which has been highly rated by these users.

In some embodiments, content-based filtering is used. Content-based filtering recommends content based on the characteristics of items that the user has previously liked. It analyzes the metadata and features of the content, such as genres, actors and themes, to find similar items. This technique can leverage the detailed narrative-related metadata generated during content analysis to match content segments that align with a user's specific preferences (e.g., preferred genres, themes, or character types). The algorithm continuously learns from new user interactions to refine its understanding of the user's preferences, ensuring more accurate recommendations over time. In one illustrative example, a user liking movies starring a particular actor can cause the system to recommend another movie starring that actor.

In some embodiments, a hybrid system can be used. Hybrid systems combine collaborative filtering and content-based filtering to improve recommendation accuracy. By integrating both approaches, the system can leverage the strengths of each to provide more personalized and relevant recommendations. A hybrid system can use collaborative filtering to identify general content preferences and content-based filtering to fine-tune recommendations based on detailed narrative elements. The hybrid system dynamically adjusts the weight given to collaborative and content-based methods based on the user's evolving preferences and feedback. In one illustrative example, a user's direct feedback on a content item can be combined with similar user group data, balancing both specific interests and broader user behavior trends.

In some embodiments, deep learning techniques can be used. In one embodiment, a deep learning model, such as neural networks, can be trained to predict user preferences based on complex patterns in viewing behavior and content features. In one embodiment, a RNN can be used to model sequences of user interactions with content, capturing temporal dynamics in viewing habits. In another embodiment, transformer models, like BERT or GPT, can be used to understand and predict user preferences based on textual data and interactions. In one illustrative example, a neural network analyzes the user's complete interaction history to predict upcoming shows they might enjoy based on a pattern of enjoying apocalyptic and dystopian series.

In some embodiments, reinforcement learning can be used. Reinforcement learning involves training a model to make recommendations by maximizing a cumulative reward signal based on user satisfaction and engagement. This technique can dynamically adjust recommendations based on real-time feedback from users, continuously improving the relevance of the content suggested. This technique rewards the system for accurate recommendations, encouraging continuous improvement based on user interactions and satisfaction. In one illustrative example, reinforcement learning is used to adjust its parameters each time the user follows a recommendation and provides a positive rating.

In some embodiments, natural language processing (NLP) can be used for sentiment analysis and thematic analysis. The sentiment analysis can analyze user reviews and feedback to understand their preferences and sentiments towards different types of content. The thematic analysis can identify themes and topics in content to match user preferences with relevant content segments.

In an example workflow for content recommendation, content is first analyzed and classified according to the content analysis described above. The narrative-related metadata is stored in a searchable format, including themes, plot points, character interactions, and emotional tones. This can be done for multiple video content items in a library of video content.

Next, a user profile is analyzed. User preferences are collected, including genres, themes, historical viewing data, and available viewing time. Next, a user profile is created that captures their preferences and viewing habits.

Next, content is matched to the user profile. The metadata database is searched to locate relevant content items and clips that match the user's profile. Finally, AI/ML techniques such as collaborative filtering, content-based filtering, hybrid systems, deep learning, and reinforcement learning are applied to generate personalized content recommendations. The output of the method is a list of personalized micro-binge clips that fit the user's preferences and time constraints. The recommendation model can be continuously updated based on user feedback and interactions to improve future recommendations.

Figure 9:
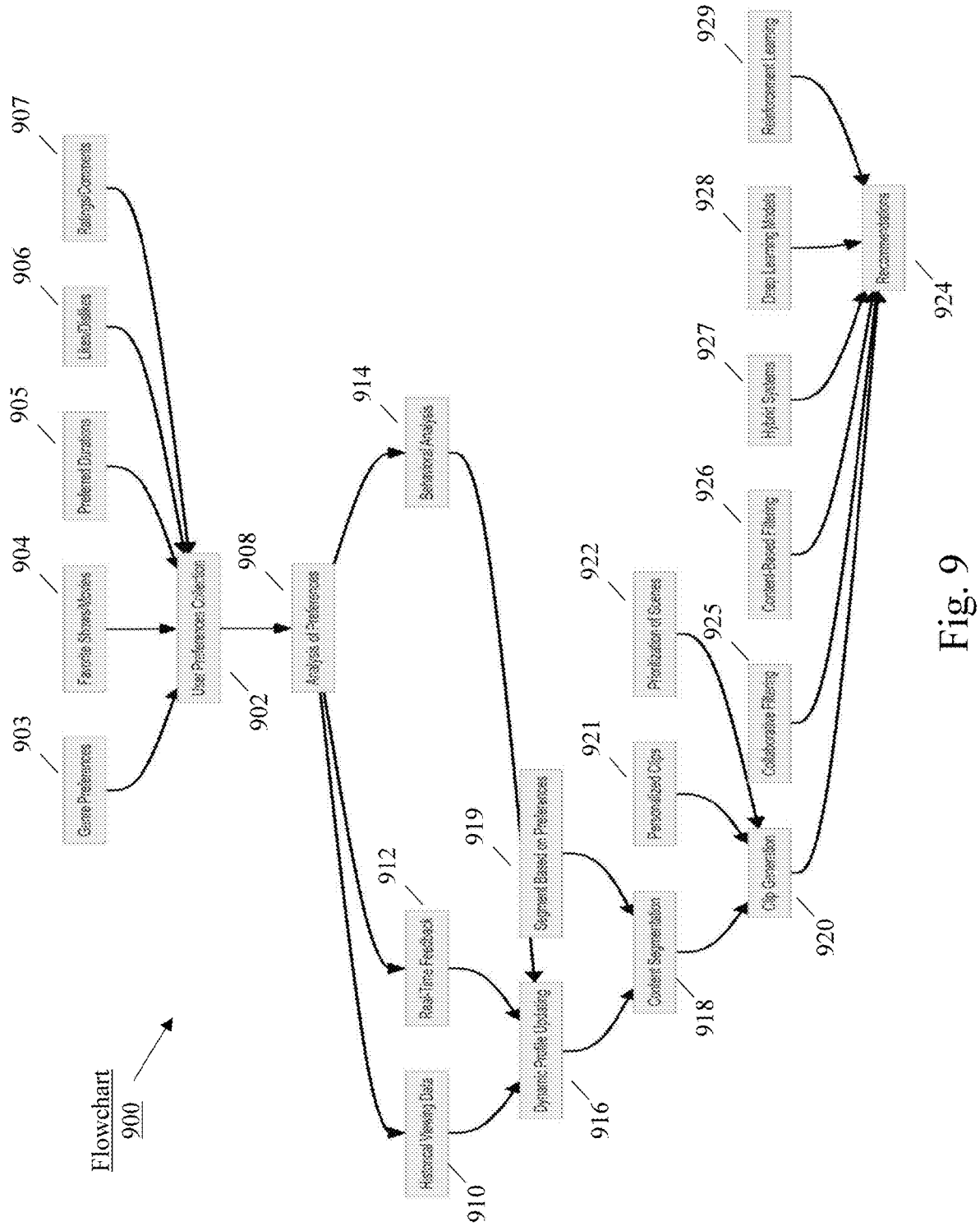
FIG. 9 shows a flowchart for user preference handling for generating video clips and recommendations according to various example embodiments.

FIG. 9 shows a flowchart 900 for user preference handling for generating video clips and recommendations according to various example embodiments.

In 902, user preferences are collected. The user preferences can include genre preferences 903, favorites 904 (shows or movies), durations 905, likes/dislikes 906 and/or ratings/comments 907. In 908, the user preferences are analyzed. The analysis includes historical viewing data 910, real-time feedback 912 and a behavioral analysis 914. In view of these analyses, in 916, a user profile is updated.

In 918, video content is segmented 918 based on the preferences 919. This can include video content selected by the user or located for the user based on the preferences 919. In 920, a clip is generated. The clip can be a personalized clip 921 and/or prioritize certain scenes 922 in view of the user preferences.

In 924, a recommendation is made to the user. The recommendation can be based on collaborative filtering 925, content-based filtering 926, hybrid systems 927, deep learning models 928 and/or reinforcement learning 929.

Figure 10:
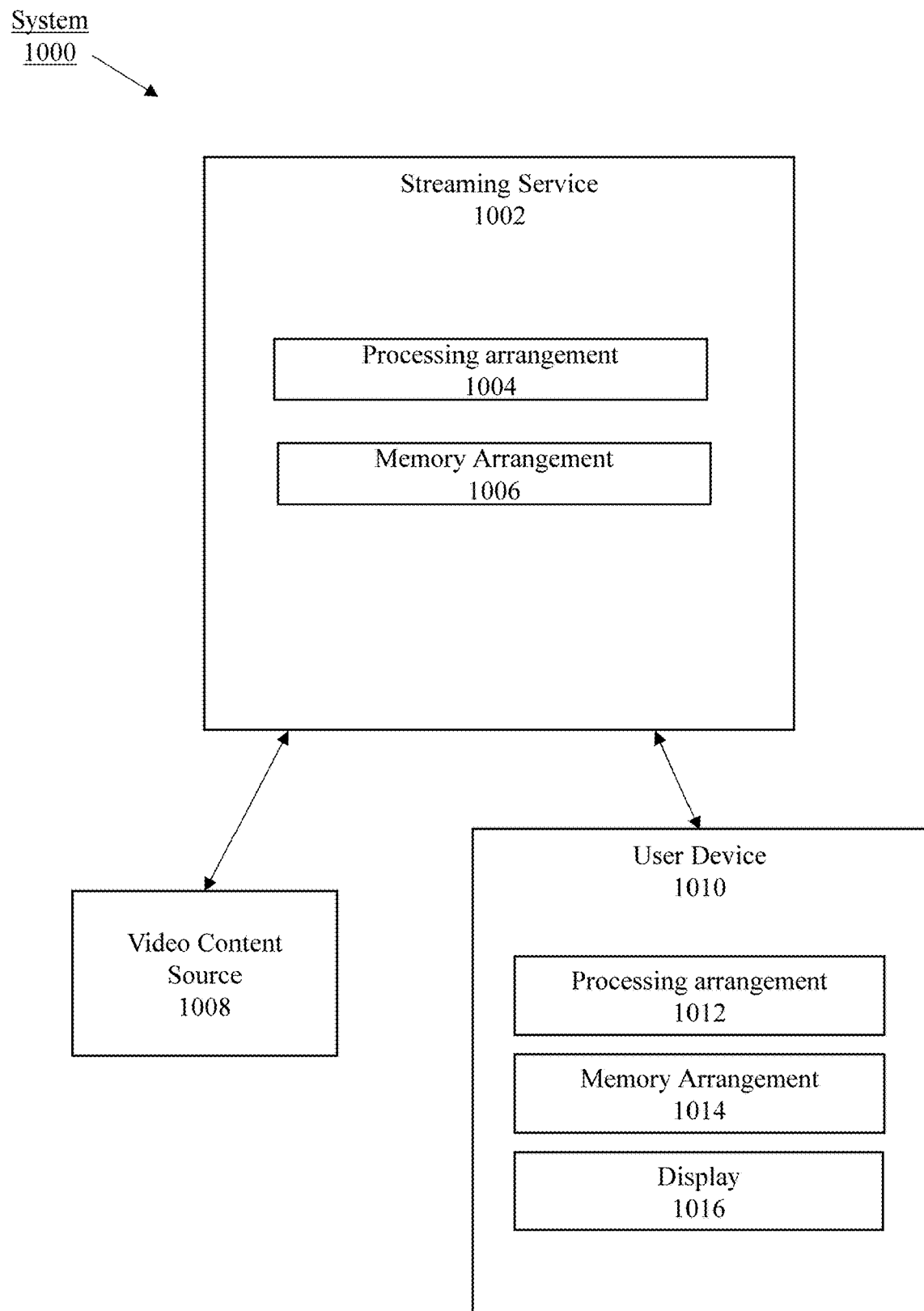
FIG. 10 shows an exemplary system according to various exemplary embodiments.

FIG. 10 shows an exemplary system 1000 according to various exemplary embodiments. The system 1000 includes a streaming service 1002, a video content source 1008, and a user device 1010. The streaming service 1002 may allow a user to access video content on demand via the user device 1010.

Those skilled in the art will understand that the user device 1010 may be any type of electronic component configured to communicate via a network, e.g., a mobile phone, a tablet computer, a smartphone, a laptop computer, a desktop computer, a set top box, a multimedia receiver, a smart TV, a game console, a wearable device, an internet of things (IoT) device, etc. Thus, the user device 1010 may represent any electronic device equipped with hardware, software and/or firmware configured to receive a video stream and directly or indirectly generate video/audio output based on the multimedia data included in the video stream.

The streaming service 1002 and the user device 1010 may communicate in any known manner (e.g., via a network). The network may represent one or more networks. The user device 1010 and the streaming service 1002 may each connect to the network wirelessly or using a wired connection. Those skilled in the art will understand the procedures and protocols that may be implemented for each of the user device 1010 and the streaming service 1002 to connect to the network and communicate with a remote endpoint via the network connection. It should be understood that each of the components may connect in any manner to the network. The entity providing the streaming service 1002 may have an internal network (e.g., LAN) that connects to the public Internet to provide the streaming service 1002. Thus, it should be understood that any network may be used to connect the various components or the system 1000.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above-described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

The user device 1010 may be equipped with a video player configured to generate video and/or audio output based on, at least in part, multimedia data received from the streaming service 1002. In some embodiments, the user device 1010 may access the streaming service 1002 via a user-facing application. In other embodiments, the user device 1010 may access the streaming service 1002 via a web browser. However, any reference to the user device 1010 accessing the streaming service 1002 in any particular manner is only provided for illustrative purposes. The exemplary embodiments may apply to the user device 1010 accessing the streaming service 1002 in any appropriate manner. The user device 1010 comprises a processing arrangement 1012, a memory arrangement 1014, and a display 1016 suitable for streaming the video content.

The streaming service 1002 may provide multiple programs available on demand. The streaming service 1002 may utilize various hardware, software and/or firmware components to provide video streams to connected user devices. The streaming service 1002 includes a processing arrangement 1004 and a memory arrangement 1006. For example, the streaming service may be comprised of one or more servers. Each server may include a processor configured to perform various operations on behalf of the streaming service 1002. However, reference to a processor is merely for illustrative purposes. The operations performed by each server may also be represented as a separate incorporated component of the server or may be a modular component coupled to the server, e.g., an integrated circuit with or without firmware.

For example, the integrated circuit may include input circuitry configured to receive signals and processing circuitry configured to process the signals and other information. In addition, in some servers, the functionality of the processor is split among two or more processors. In some embodiments, the functionality described for the server may include a cloud implementation such as a set of virtual or hardware servers hosting firmware. The exemplary embodiments may be implemented in any of these or other configurations of a server.

The streaming service 1002 may also include one or more databases directly or indirectly accessible by the one or more servers. For example, the streaming service 1002 may use a database to store multimedia data to be included in a VOD stream and a database for storing the results of a content analysis for generating video clips. These databases may be implemented using hardware, software and/or firmware of a single device (e.g., server) or may be implemented using hardware, software and/or firmware from multiple devices. In some embodiments, the functionality described for the databases may include a cloud implementation such as a set of virtual or hardware servers hosting firmware. The exemplary embodiments may be implemented in any of these or other configurations of a database. Those skilled in the art will understand that the exemplary concepts described herein may be applicable to any scenario in which a server provides a video stream to a remote endpoint over one or more network connections. The streaming service 1002 may receive video content from external video content source(s) 1008.

The streaming service 1002 may further include one or more communication interfaces configured to facilitate communication with connected user devices and with the network and between hardware, software and/or firmware components included within the streaming service 1002.

In one embodiment, a personalized content delivery system uses Natural Language Processing (NLP) and image recognition technologies to analyze and curate video content, providing personalized micro-binge clips based on individual user preferences and available viewing time. This embodiment relates to a system architecture that integrates NLP and image recognition for content analysis and curation. The system includes: NLP Analysis: Processes closed captions to identify key plot points, dialogues, and thematic elements; Image Recognition: Analyzes video frames to detect significant visual elements like character expressions, objects, and scenes; Integration: Combines results from NLP and image recognition to generate comprehensive metadata; Personalization: Utilizes user preferences, such as available viewing time and genre preferences, to curate personalized micro-binge clips; Delivery: Ensures the curated clips are delivered to users in a seamless and engaging manner.

This embodiment uses an integrated approach of using both NLP and image recognition to provide a tailored viewing experience.

In another embodiment, a content analysis method includes analyzing closed captions and video frames to identify key plot points and significant visual elements, ensuring a comprehensive understanding of the content's narrative and emotional impact. This embodiment relates to a specific method used for content analysis, including: Closed Captions Analysis: Using NLP techniques such as tokenization, part-of-speech tagging, and named entity recognition to extract key phrases and plot points; Video Frame Analysis: Employing image recognition technologies like convolutional neural networks (CNNs) to detect significant visual elements and scenes; Combined Analysis: Harmonizing the outputs of NLP and image recognition to create a unified narrative map; Metadata Generation: Producing detailed metadata that captures the narrative and emotional essence of the content.

This method ensures a thorough understanding of the content's narrative, protecting the unique combination of NLP and image recognition techniques.

In another embodiment, a user preference handling mechanism collects and analyzes user data, including viewing habits, genre preferences, and available viewing time, to create personalized viewing profiles and continuously refine content recommendations. This embodiment focuses on the user data collection and analysis mechanism, including: Data Collection: Gathering user inputs such as available viewing time, preferred genres, and historical viewing data; Profile Creation: Using machine learning algorithms to analyze the collected data and generate detailed user profiles; Continuous Refinement: Updating user profiles based on new data and feedback, ensuring that recommendations evolve with changing preferences; Privacy and Security: Ensuring the safe and secure handling of user data.

This mechanism allows for highly personalized content recommendations based on the processes and algorithms used to create and update user profiles.

In another embodiment, a clip generation process generates short, coherent clips from analyzed video content, ensuring that these clips maintain a coherent narrative flow and fit within user-defined viewing windows. This embodiment relates to the specific process for generating micro-binge clips, including: Segmentation: Using predefined rules to segment video content based on narrative importance; Condensation: Reducing the duration of selected scenes while preserving their narrative essence; Stitching: Combining segmented scenes into a coherent clip that fits within the user-defined viewing window; Narrative Flow: Ensuring the generated clips maintain a logical and engaging narrative flow.

This process relates to the methodology of creating concise, narrative-rich clips that fit user preferences and time constraints.

In another embodiment, a content recommendation algorithm matches generated micro-binge clips with individual user profiles, considering factors such as content freshness and genre diversity to ensure personalized and engaging recommendations. This embodiment includes a recommendation algorithm, including: Algorithm Design: Developing a machine learning algorithm that integrates collaborative filtering and content-based filtering; Profile Matching: Matching user profiles with relevant micro-binge clips based on preferences, historical data, and available time; Content Freshness: Prioritizing newer content and trending genres to keep recommendations up-to-date; Diversity: Ensuring a diverse mix of content types and genres to maintain user engagement; Feedback Loop: Incorporating user feedback to continuously improve recommendation accuracy.

This algorithm ensures personalized and engaging content recommendations, protecting the techniques used to match content with user profiles.

In another embodiment, an advanced segmentation model dynamically adjusts the selection and duration of video segments based on user-defined parameters and real-time content analysis. This embodiment relates to the advanced segmentation model used to dynamically adjust video segments, including: Real-Time Analysis: Continuously analyzing content to adapt segment selection based on real-time changes in user preferences or viewing patterns; Dynamic Adjustment: Modifying the duration and inclusion of segments based on user-defined parameters such as available viewing time and preferred content intensity; Prioritization Algorithm: Utilizing an algorithm that prioritizes key narrative moments and adjusts segment lengths to ensure the most important scenes are included; Seamless Transition: Ensuring smooth transitions between segments to maintain narrative coherence and viewer engagement.

This embodiment relates to the dynamic and adaptive nature of the segmentation model, which optimizes content delivery in real-time.

In another embodiment, an interactive content customization system allows users to interactively customize their micro-binge experience by selecting preferred narrative elements, character focuses, and thematic content. This embodiment relates to the interactive customization features provided to users, including: User Interface: An intuitive interface that allows users to select specific narrative elements, characters, or themes they wish to focus on in their micro-binge session; Customization Options: Offering a range of customization options, such as highlighting specific characters, focusing on action scenes, or including only comedic elements; Real-Time Adjustment: Dynamically adjusting the content segments based on user selections to create a tailored viewing experience; Feedback Integration: Incorporating user feedback to refine and enhance the customization options available.

This embodiment relates to the interactive features that enable users to personalize their micro-binge sessions according to their preferences.

In another embodiment, an emotion recognition and integration method integrate emotion recognition with narrative analysis to enhance the understanding of character interactions and emotional impact in video content. This embodiment relates to the integration of emotion recognition with narrative analysis, including: Emotion Detection: Using advanced image recognition technologies to detect and classify emotions based on facial expressions and body language; Narrative Integration: Combining emotion data with narrative analysis to provide a deeper understanding of character interactions and emotional arcs; Metadata Generation: Producing detailed metadata that includes emotional context, enhancing the accuracy of content recommendations and segment selection; Enhanced Personalization: Leveraging emotion recognition to tailor content delivery to the user's emotional preferences and responses.

This embodiment relates to the method of enhancing narrative analysis with emotion recognition, providing a richer and more personalized viewing experience.

An enhanced Prototype for AI-Powered Micro-Binge Watching incorporates caption loading, keyword extraction, document splitting, embedding, vectorization, and querying a language model to identify and deliver personalized content segments based on user preferences. The focus is on delivering a solution that can be refined during development.

In a first step, subtitles are loaded and pre-processed. The prototype begins by loading the caption file using the TextLoader class from the langchain_community.document_loaders module. Next, the KeyBERT library extracts significant keywords from each line of the captions while retaining the associated timestamps. This step is crucial for identifying the key narrative elements efficiently.

In a second step, documents are split. The loaded captions are split into smaller chunks using the RecursiveCharacterTextSplitter. This splitter breaks down the document into manageable pieces based on a specified chunk size, facilitating efficient processing and vectorization.

In a third step, embedding and vectorization are performed. The chunks are transformed into vector representations using the OpenAIEmbeddings class. This conversion is essential for creating a searchable vector space. These vectors are stored in a FAISS (Facebook AI Similarity Search) index, enabling rapid similarity searches.

In a fourth step, keywords and timestamps are compiled. The extracted keywords from the captions are compiled into a single text string, which will be used to query the language model.

In a fifth step, a language model is queried. A dynamic prompt is created using the PromptTemplate class. This prompt includes the keywords and an additional parameter that specifies the desired emotion (e.g., "funny"). Using the create_retrieval_chain function, a retrieval-based question-answering (QA) chain is constructed. This chain leverages the OpenAI language model to analyze the provided keywords and identify relevant scenes.

In a sixth step, output is generated. The program processes the response from the OpenAI model, which includes the identified scenes and their respective timestamps. The resulting timestamps and scenes are displayed, providing a clear and concise output of the identified emotional scenes within the captions.

Some enhancements and additional features include the following. For advanced segmentation and personalization, the system dynamically adjusts the segmentation based on the user's available viewing time, ensuring the most critical narrative elements are included within the specified duration. Additional parameters for emotions or themes can be specified by the user to further personalize the viewing experience.

For dynamic query adjustments, real-time customization can be enabled. Users can interactively customize their viewing preferences (e.g., selecting specific characters or scenes) in real-time, and the system will adjust the query and segmentation accordingly. A user-friendly interactive interface allows for easy selection and adjustment of preferences, enhancing the overall user experience.

For enhanced storage and retrieval, the prototype supports replacing OpenAI with other services like VertexAI or using different vector databases instead of FAISS, ensuring flexibility and scalability. The system is designed to handle large volumes of content efficiently, making it suitable for deployment in large-scale streaming platforms.

For integration with existing systems, the prototype is built to integrate seamlessly with existing streaming platforms, enabling easy adoption and deployment. Multi-device support can be enabled, in which users can switch between devices while maintaining their place in the narrative, ensuring a continuous viewing experience.

This enhanced prototype provides a comprehensive solution for AI-powered Micro-Binge Watching, incorporating advanced NLP and image recognition techniques, dynamic query adjustments, and personalized content delivery. By leveraging pre-processing, keyword extraction, embedding, and vectorization, the system can efficiently analyze and segment video content to create personalized micro-binge clips. The flexibility to replace libraries and integrate with existing systems ensures scalability and adaptability, making it an ideal solution for modern streaming platforms.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor configured to:
    load a first video file of a first video content item, the first video file comprising video frames associated with timestamps;
    load a first subtitle file of the first video content item, the first subtitle file comprising subtitle text associated with the timestamps;
    execute a natural language processing (NLP) model with the subtitle text as input, the NLP model including language pre-processing steps for classifying words, names or phrases in the subtitle text and associating initial classifiers with the subtitle text, the NLP model including one or more of a recurrent neural network (RNN), a Bidirectional Encoder Representations from Transformers (BERT) model, or a generative pre-trained transformer (GPT) model for a dialogue analysis comprising processing sequences of dialogue in the subtitle text in view of the initial classifiers to associate one or more portions of the dialogue with one or more first classifiers of first narrative elements;
    execute an image recognition model with at least some of the video frames as input, the image recognition model including a convolutional neural network (CNN) for an object detection analysis and a facial recognition analysis comprising processing video sequences to associate one or more of the video frames with one or more second classifiers of second narrative elements;
    generate a narrative map of the first video content item by temporally aligning the first narrative elements with the second narrative elements based on the timestamps associated with the video frames and the first subtitle file; and
    generate a video clip including at least one segment of the first video content item, the at least one segment including selected video frames associated with at least one of the first or second narrative elements identified from the narrative map and selected for inclusion in the video clip.

2. The processor of claim 1, wherein the language pre-processing steps include tokenization, part-of-speech tagging and named entity recognition of the subtitle text to identify the initial classifiers.

3. The processor of claim 2, wherein the NLP model includes the RNN or the BERT model for performing the dialogue analysis, the dialogue analysis including one or more of a sentiment analysis, a contextual analysis, an emotion detection analysis and a keyword extraction, the RNN or the BERT model processing sequences of the dialogue to identify the one or more first classifiers of the first narrative elements based on the sentiment analysis, the contextual analysis, the emotion detection analysis or the keyword extraction.

4. The processor of claim 3, wherein the NLP model includes a Latent Dirichlet Allocation (LDA) for performing a thematic analysis, the LDA configured for topic modeling to categorize the dialogue into themes based on word co-occurrence patterns, the LDA identifying the one or more first classifiers of the first narrative elements based on the thematic analysis.

5. The processor of claim 3, wherein the NLP model includes the GPT model for performing a thematic analysis, the GPT model configured for supplementing the dialogue analysis by generating text based on patterns in the dialogue to predict narrative developments, the GPT identifying the one or more first classifiers of the first narrative elements based on the thematic analysis.

6. The processor of claim 3, wherein the image recognition model includes the CNN for performing an event detection analysis, the event detection analysis configured to detect narrative events in the video frames, wherein the NLP model supplements the event detection by providing context for the narrative events detected in the video frames, the CNN identifying the one or more second classifiers of the second narrative elements based on the event detection analysis.

7. The processor of claim 1, further configured to:
extract from the first video file a subset of the video frames at a predetermined frequency; and
preprocess the subset of the video frames by resizing or normalization so that the input to the image recognition model has a predetermined form.

8. The processor of claim 7, wherein the image recognition model includes the CNN for performing an emotion recognition analysis, the emotion recognition analysis including identifying emotions on faces depicted in one video frame or a sequence of video frames, the CNN identifying the one or more second classifiers of the second narrative elements based on the emotion recognition analysis.

9. The processor of claim 8, wherein the image recognition model includes the CNN for performing a scene classification analysis, the scene classification analysis including classifying scenes depicted in the sequence of the based on at least one of the object detection analysis, the facial recognition analysis and the emotion recognition analysis, the CNN identifying the one or more second classifiers of the second narrative elements based on the scene classification analysis.

10. The processor of claim 8, wherein the image recognition model includes the CNN for performing an action recognition analysis, the action recognition analysis including identifying actions depicted in the sequence of the video frames based on at least one of the object detection analysis, the facial recognition analysis and the emotion recognition analysis, the CNN identifying the one or more second classifiers of the second narrative elements based on the action recognition analysis.

11. The processor of claim 1, further configured to:
generate a set of third narrative elements based on temporally aligning the first narrative elements with the second narrative elements and correlating contextual information identified in the first narrative elements and the second narrative elements, each of the third narrative elements associated with a corresponding one or more timestamps.

12. The processor of claim 11, wherein the narrative map is generated based on a coherence analysis and a continuity analysis in which it is determined that the third narrative elements maintain a logical narrative flow.

13. The processor of claim 11, wherein one or more of the third narrative elements are associated with a priority in which one or more of the third narrative elements are associated with a higher priority for inclusion in the video clip than other ones of the third narrative elements.

14. The processor of claim 13, wherein the priority is determined by a support vector machine (SVM) or a decision tree ranking the third narrative elements based on a narrative significance.

15. The processor of claim 1, further configured to:
collect first training data including subtitles, transcripts and dialogues for multiple different video content items;
preprocess the first training data by text cleaning, tokenization and named entity recognition (NER);
label text from the first training data with one or more of the first classifiers based on the preprocessing; and
create a first training set comprising labeled text associated with the first classifiers.

16. The processor of claim 15, further configured to:
fine-tune the NLP model by annotated subtitle data using transfer learning techniques; and
validate the NLP model using a validation dataset.

17. The processor of claim 15, further configured to:
collect second training data including video files and images for multiple different video content items;
label video frames from the second training data with one or more of the second classifiers; and
create a second training set including labeled video frames associated with the second classifiers.

18. The processor of claim 17, further configured to:
fine-tune the image recognition model by annotated image data using transfer learning techniques; and
validate the image recognition model using a validation dataset.

19. The processor of claim 1, wherein the narrative map includes at least one priority associated with at least one of the first and second narrative elements, wherein the video clip is generated based on predefined maximum duration for the video clip and the one or more segments are selected based on the at least one priority.

20. The processor of claim 19, wherein the video clip is generated based on the narrative map to ensure coherent sequence and continuity.

* * * * *